United States Patent
Stalker et al.

(10) Patent No.: US 11,030,505 B1
(45) Date of Patent: Jun. 8, 2021

(54) ALTERNATIVE IDENTIFICATION OF OBJECTS FOR CONSTRAINED NETWORKS

(71) Applicant: SIGNIFY HOLDING B.V., Eindhoven (NL)

(72) Inventors: Altan Stalker, Lawrenceville, GA (US); Peyton Riley, Suwanee, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/728,787

(22) Filed: Dec. 27, 2019

(51) Int. Cl.
| | | |
|---|---|---|
| *G06K 19/07* | (2006.01) | |
| *H04W 64/00* | (2009.01) | |
| *H04W 4/029* | (2018.01) | |

(52) U.S. Cl.
CPC ........ *G06K 19/0723* (2013.01); *H04W 4/029* (2018.02); *H04W 64/006* (2013.01)

(58) Field of Classification Search
CPC .................................................. G06K 19/0723
See application file for complete search history.

(56) References Cited

U.S. PATENT DOCUMENTS

| | | | |
|---|---|---|---|
| 5,352,957 A | 10/1994 | Werner | |
| 9,099,004 B2 * | 8/2015 | Milburn, Jr. ........... | B60Q 9/006 |
| 9,542,824 B2 * | 1/2017 | Beggs ..................... | G08B 6/00 |
| 10,103,975 B2 | 10/2018 | Richley et al. | |
| 10,591,627 B2 * | 3/2020 | Frederick ............. | G05D 1/0265 |
| 2015/0124087 A1 * | 5/2015 | Jones, Jr. ............. | G08B 19/005 |
| | | | 348/143 |
| 2015/0358852 A1 | 12/2015 | Richley et al. | |
| 2018/0167141 A1 | 6/2018 | Schenk et al. | |
| 2019/0244376 A1 * | 8/2019 | Choi ....................... | G06F 3/017 |
| 2020/0275402 A1 * | 8/2020 | Shi ......................... | H04W 16/28 |
| 2020/0298494 A1 * | 9/2020 | Huang ............... | G05B 19/4188 |
| 2020/0302630 A1 * | 9/2020 | Spader ................... | G06Q 40/08 |

\* cited by examiner

*Primary Examiner* — K. Wong

(57) ABSTRACT

A system for assigning alternative identification to objects can include a first communication device of a first object, where the first communication device broadcasts a first communication signal that includes a first identification of the first object. The system can also include a first electrical device having a first receiver and a first transmitter, where the first receiver receives the first communication signal. The system can further include a controller communicably coupled to the first electrical device, where the controller retrieves the first identification of the first communication device from the first communication signal, assigns a first alternative identification to the first communication device based on the first identification, saves the first identification and the first alternative identification of the first object in a first table, and sends a second communication signal that includes the first alternative identification and the first identification of the first object.

20 Claims, 16 Drawing Sheets

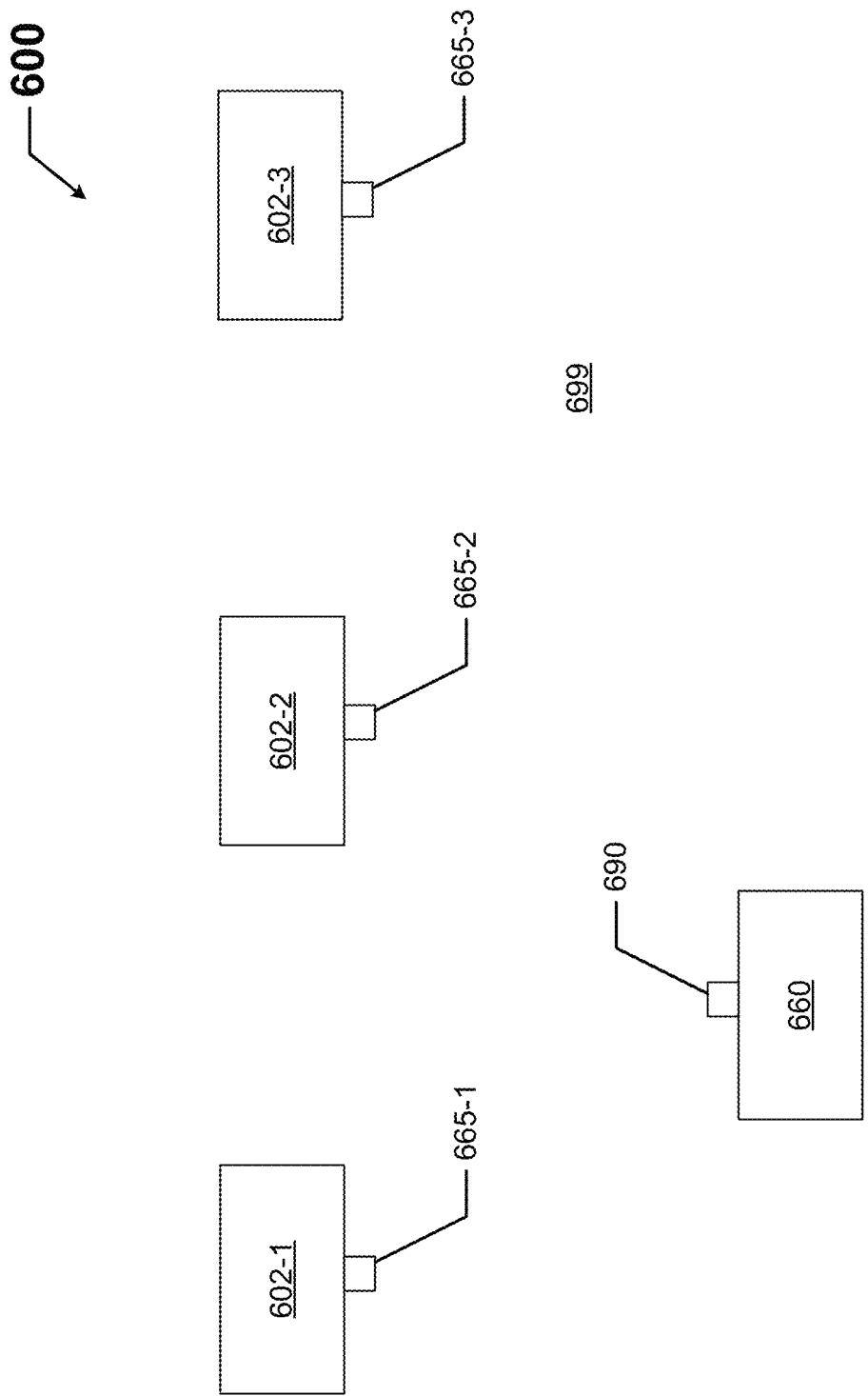

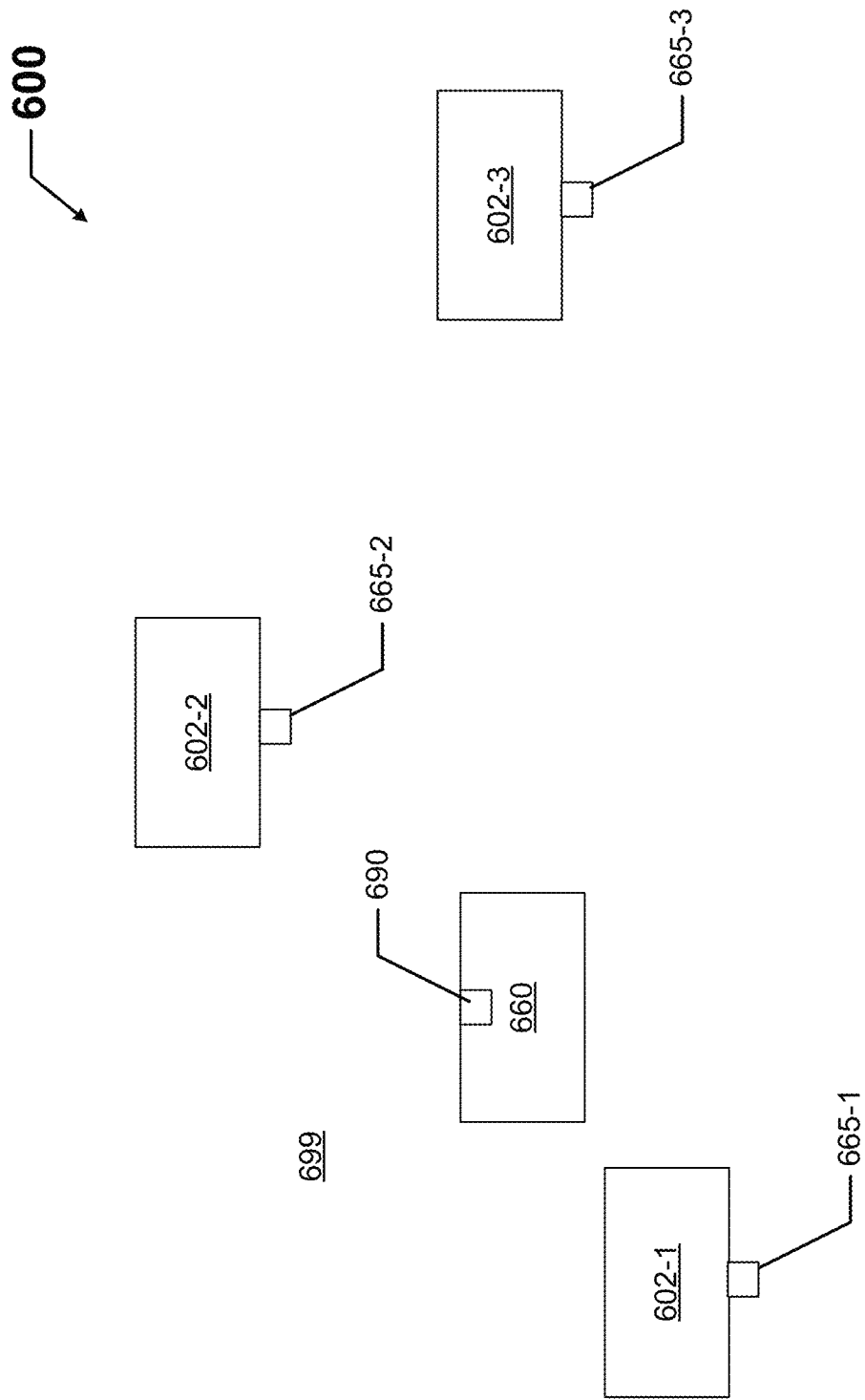

US 11,030,505 B1

ALTERNATIVE IDENTIFICATION OF OBJECTS FOR CONSTRAINED NETWORKS

TECHNICAL FIELD

Embodiments described herein relate generally to locating objects in a space, and more particularly to systems, methods, and devices for alternative identification of objects in constrained networks.

BACKGROUND

Different methods are used to locate an object within a volume of space. For example, when signals (e.g. radio frequency (RF) signals) are involved, the strength of each signal can be measured to help determine the location of an object within a volume of space. When the location is done in real-time, the system to implement this process is often referred to as a real-time location system (RTLS). Each object can be associated with an identification number.

SUMMARY

In general, in one aspect, the disclosure relates to a system for assigning alternative identification to objects in a volume of space. The system can include a first communication device of a first object disposed in the volume of space, where the first communication device broadcasts a first communication signal into the volume of space, where the first communication signal includes a first identification of the first object. The system can also include a first electrical device disposed in the volume of space, where the first electrical device includes a first receiver and a first transmitter, where the first receiver receives the first communication signal broadcast by the first communication device of the first object. The system can further include a controller communicably coupled to the first electrical device. The controller can retrieve the first identification of the first communication device from the first communication signal. The controller also can assign a first alternative identification to the first communication device based on the first identification. The controller further can save the first identification and the first alternative identification of the first object in a first table. The controller also can send a second communication signal that includes the first alternative identification and the first identification of the first object.

In another aspect, the disclosure can generally relate to a controller for assigning alternative identification to objects in a volume of space. The controller can be configured to receive a first identification of a first communication device associated with a first object in a first communication signal. The controller can also be configured to assign a first alternative identification to the first communication device based on the first identification. The controller can further be configured to save the first identification and the first alternative identification of the first object in a table. The controller can also be configured to send a second communication signal the includes the first alternative identification and the first identification of the first object.

These and other aspects, objects, features, and embodiments will be apparent from the following description and the appended claims.

BRIEF DESCRIPTION OF THE DRAWINGS

The drawings illustrate only example embodiments of real-time location of an object using multiple electrical devices and are therefore not to be considered limiting of its scope, as real-time location of an object using multiple electrical devices may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles. In the drawings, reference numerals designate like or corresponding, but not necessarily identical, elements.

FIGS. 6A and 6B show a side and top view, respectively, of a system in which an object is located in a volume of space in accordance with certain example embodiments.

DETAILED DESCRIPTION OF EXAMPLE EMBODIMENTS

Figure 1:
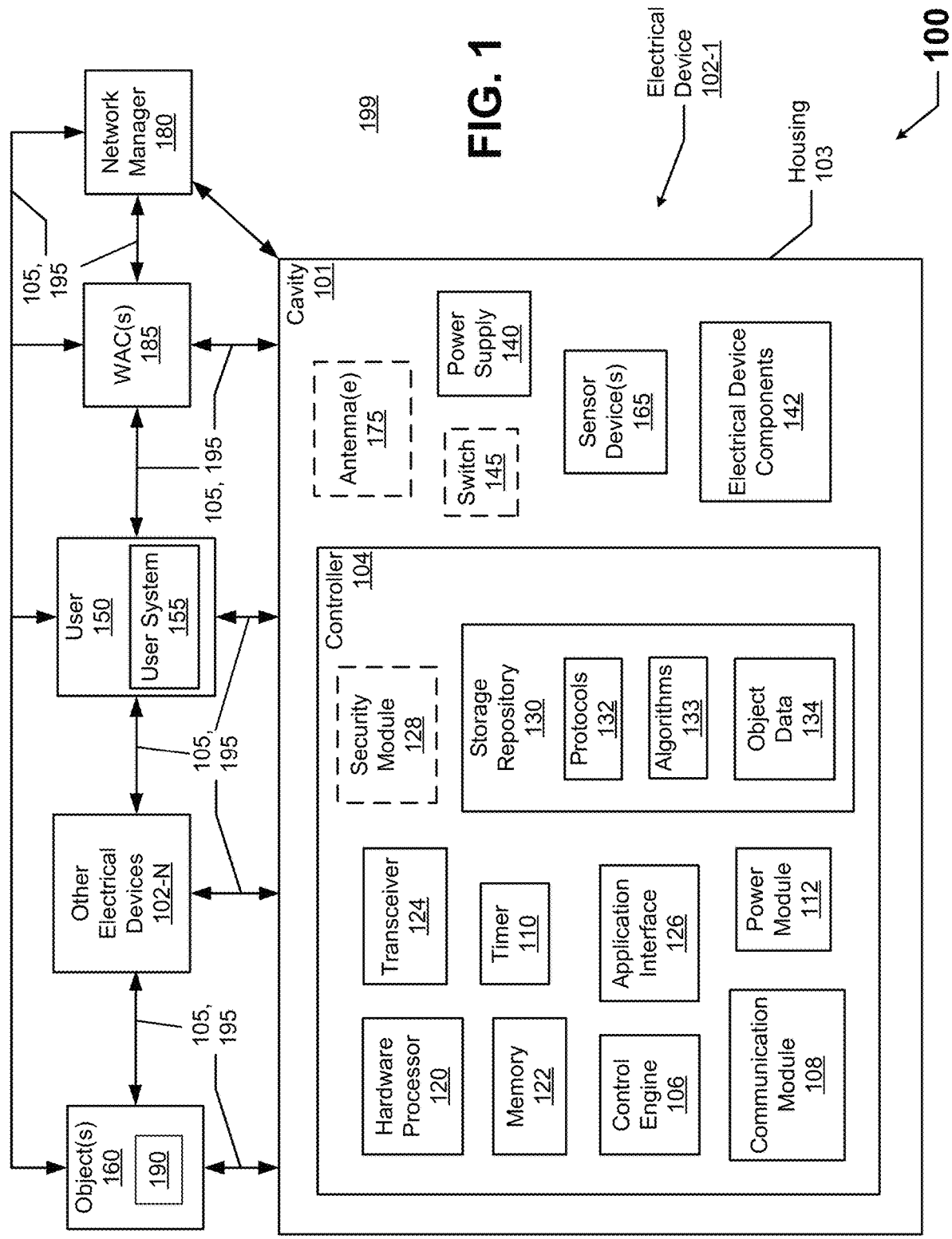
FIG. 1 shows a diagram of a system in accordance with certain example embodiments.

The example embodiments discussed herein are directed to systems, methods, and devices for alternative identification of objects in constrained networks. While example embodiments are described herein as using multiple light fixtures to locate and identify an object in a volume of space, example embodiments can use one or more of a number of other electrical devices in addition to, or as an alternative to, light fixtures. Such other electrical devices can include, but are not limited to, a light switch, a control panel, a thermostat, an electrical wall outlet, an integrated sensor device (defined below) (e.g., a smoke detector, a CO2 monitor, a motion detector, a broken glass sensor), and a camera.

Further, any of a number of location methods can be used with example embodiments to locate one or more objects in real-time (using RTLS). Examples of such location methods can include, but are not limited to, time-of-flight (ToF), angle of arrival (AoA), and angle of departure (AoD). Any of these methods can involve measurements of one or more other parameters with respect to signals aside from signal strength. Examples of such other parameters can include, but are not limited to, distance of travel, angle, and time of travel. Regardless of the location method used, these signals include an identification of an object, and example embodiments provide an alternative identification for the object.

Example embodiments can be used for a volume of space having any size and/or located in any environment (e.g., indoor, outdoor, hazardous, non-hazardous, high humidity, low temperature, corrosive, sterile, high vibration). Further, while signals described herein are radio frequency (RF)

signals, example embodiments can be used with any of a number of other types of signals and/or platform, including but not limited to visible light signals, LiFi, WiFi, Bluetooth, Bluetooth Low Energy (BLE), RFID, ultraviolet waves, microwaves, and infrared signals. For example, RF signals transmitted using BLE are sent and received at approximately 2.4 GHz.

When an electrical device in an example system is a light fixture (also called a luminaire), the light fixture can be any of a number of types of light fixtures, including but not limited to a troffer, a pendant light fixture, a floodlight, a spotlight, an emergency egress fixture, an exit sign, a down can light fixture, and a high bay light fixture. Regardless of the type of light fixture, such a light fixture can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source.

Example embodiments provide various methods to provide an alternative identification for an object in an efficient manner that uses relatively little bandwidth. Example embodiments can be used to provide an alternative identification for an object in real time using RTLS structures. In addition, example embodiments provide a high level of data security if such security is desired by a user. Example embodiments are also more reliable compared to location methods used in the current art, using low amounts of power on demand. Example embodiments can be installed with new electrical (e.g., lighting, security, entertainment, HVAC) systems, including electrical devices thereof. Alternatively, example embodiments can be programmed into existing electrical systems and related equipment with little to no need to add or modify existing hardware.

In certain example embodiments, electrical devices used for real-time location of an object and subsequently providing an alternative identification of the object are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of alternative identification of objects in constrained networks will be described more fully hereinafter with reference to the accompanying drawings, in which example embodiments of alternative identification of objects in constrained networks are shown. Alternative identification of objects in constrained networks may, however, be embodied in many different forms and should not be construed as limited to the example embodiments set forth herein. Rather, these example embodiments are provided so that this disclosure will be thorough and complete, and will fully convey the scope of alternative identification of objects in constrained networks to those or ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and such terms are not meant to limit embodiments of alternative identification of objects in constrained networks. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes multiple electrical devices 102 and one or more objects 160 in a volume of space 199 in accordance with certain example embodiments. Specifically, the system 100 can include electrical device 102-1, one or more other electrical devices 102-N, one or more users 150, a network manager 180, and one or more wireless access controllers 185 (WACs 185). Electrical device 102-1 and the other electrical devices 102-N can collectively be referred to as electrical devices 102. Each electrical device 102 (e.g., electrical device 102-1) can include a controller 104, one or more sensor devices 165, one or more optional antennae 175, an optional switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in an example electrical device 102. Any component of the example electrical device 102 can be discrete or combined with one or more other components of the electrical device 102. For example, each electrical device 102 in the system 100 can have its own controller 104. Alternatively, one controller 104 can be used to control multiple electrical devices 102 in the system. An electrical device 102 is any device that uses electricity, at least in part, to operate. A list of some potential electrical devices 102 is described above.

A user 150 may be any person that interacts with an electrical device 102 and/or an object 160 in the volume of space 199. Specifically, a user 150 may program, operate, and/or interface with one or more components (e.g., a controller 104, a WAC 185, the network manager 180) associated with the system 100 using example embodiments. Examples of a user 150 can include, but are not limited to, an employee, an engineer, an electrician, a technician, an operator, a visitor, a supervisor, a consultant, a contractor, an asset, the network manager 180, and a manufacturer's representative.

A user 150 can include and use a user system 155 (also sometimes called a user device 155), which may include a display (e.g., a GUI). A user 150 (including an associated user system 155) interacts with (e.g., sends data to, receives data from) the controller 104 of an electrical device 102 via the application interface 126 (described below). A user 150 (including an associated user system 155) can also interact with the network manager 180, one or more WACs 185, the sensor devices 165, and/or one or more of the objects 160. Interaction (including transmission of communication signals 195) between a user 150 (including an associated user system 155) and the electrical devices 102, the network manager 180, the WACs 185, the sensor devices 165, and the objects 160 can be facilitated using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, Bluetooth Low Energy (BLE), Zigbee, WirelessHART, ISA100, Power Line Carrier, RS485, DALI) technology. For example, a communication link 105 can be (or include) one or more electrical conductors that are coupled to the housing 103 of electrical device 102-1 and to a sensor device 165. The communication links 105 can transmit signals (e.g., power signals, communication signals 195 (e.g., RF signals), control signals, data) between the electrical devices 102, the users 150 (including associated user system 155), the sensor devices 165, the objects 160 (including an associated communication device 190), the WACs 185, and/or the network manager 180. For example, the electrical devices 102 of the system 100 can interact with the one or more objects 160 by transmitting communication signals 195 (e.g., RF signals) over one or more communication links 105, as discussed below. The signals transmitted over the communication links 105 are made up of bits of data, which can include an identification of the object 160 (or communication device 190 thereof).

The network manager 180 is a device or component that controls all or a portion of the system 100 that includes the controller 104 of at least one of the electrical devices 102 and the WACs 185. The features (e.g., modules) included with and/or the functions performed by the network manager 180 can be substantially similar to those included with and/or performed by the controller 104 and/or a WAC 185. Alternatively, the network manager 180 can include one or more of a number of features and/or perform one or more of a number of functions in addition to, or altered from, the features of the controller 104 and/or a WAC 185, both described below. There can be more than one network manager 180 and/or one or more portions of a network manager 180.

In some cases, a network manager 180 can be called an insight manager, a master controller, or a RTLS location engine. In such a case, the network manager 180 receives data from the WACs 185 and processes this data (e.g., using algorithms 133 and/or protocols 132) to determine the location of one or more objects 160 in real time. The network manager 180 can be located in the volume of space 199 or remotely from the volume of space 199. The network manager 180 can use the various communications received from the WACs 185 to locate an object 160 in two dimensions or in three dimensions within the volume of space 199. In certain example embodiments, the network manager 180 (e.g., using a controller like the controller 104) can establish and maintain alternative identification values for one or more objects 160.

Each WAC 185 (sometimes more simply called an access controller, as a generic term and/or when wired communication links 105 are involved) performs a number of different functions. For example, a WAC 185 can help communicate with and control the controller 104 of one or more electrical devices 102 to help operate those electrical devices 102. For RTLS applications, the WAC 185 can be responsible for pairing with the Zigbee-enabled integrated sensor devices 165 and/or other electrical devices 102, providing configuration data to the integrated sensor devices 165 and/or other electrical devices 102, synchronizing the timing of those integrated sensor devices 165 and/or other electrical devices 102, supporting the firmware of those integrated sensor devices 165 and/or other electrical devices 102, upgrading those integrated sensor devices 165 and/or other electrical devices 102, receiving location/telemetry data (e.g., using a Zigbee-enabled communication links 105) from the integrated sensor devices 165 and/or other electrical devices 102, and/or performing any other function with respect to those integrated sensor devices 165 and/or other electrical devices 102 to support RTLS activities, which can include establishing and maintaining alternative identification values for one or more objects 160.

When a WAC 185 receives data (e.g., packed egress data that arrives as ingress data) from an integrated sensor device 165 and/or other electrical device 102, the WAC 185 can convert the data into a different format (e.g., ECAPI). The WAC 185 can then send the newly-formatted data to the network manager 180. To help diagnose issues, a WAC 185 can maintain counters for each paired integrated sensor device 165 and/or other electrical device 102 and include, for example, the number of received packed data messages from a particular integrated sensor device 165 and/or other electrical device 102, the number of formatted messages successfully transmitted to the network manager 180 that pertain to the packed data from a particular integrated sensor device 165 and/or other electrical device 102, and the number of formatted messages pertaining to the packed data from a particular integrated sensor device 165 and/or other electrical device 102 that failed to transmit to the network manager 180.

In some cases, a WAC 185 maintains the average and maximum latency introduced between the receipt of a message from an integrated sensor device 165 and/or other electrical device 102 and transmission of a formatted message to the network manager 180. The WAC 185 can also notify the network manager 180 when the average or maximum latency exceeds a threshold value. Further, a WAC 185 can communicate to the network manager 180 when there is a significant discrepancy (e.g., as determined by the WAC 185) between the ingress and egress packets with respect to an integrated sensor device 165 and/or other electrical device 102. When there are multiple WACs 185, they can all be time-synchronized with each other. In some cases, the features (e.g., modules) included with and/or the functions performed by a WAC 185 can be substantially the same as those included with and/or performed by the controller 104 of electrical device 102-1. A WAC 185 can be located in the volume of space 199 or remotely from the volume of space 199.

As defined herein, an object 160 can be any unit or group of units. An object 160 can move on its own, is capable of being moved, or is stationary. Examples of an object 160 can include, but are not limited to, a person (e.g., a user 150, such as a visitor or an employee), a part (e.g., a motor stator, a cover), a piece of equipment (e.g., a fan, a container, a table, a chair), or a group of parts of equipment (e.g., a pallet stacked with inventory). A system 100 can have no objects 160, one object 160, or multiple objects 160 in the volume of space 199 at a particular point in time.

Each object 160 can include a communication device 190 (also sometimes called a tag, a beacon, or other name known in the art, depending on the configuration of the communication device 190), which can receive communication signals 195 from and/or send communication signals 195 to one or more electrical devices 102, which can include an integrated sensor device 165. The communication device 190 of an object 160 can broadcast communication signals 195 that can be received by any electrical devices 102 within range of the broadcast or send communication signals 195 addressed to electrical devices 102.

A communication device 190 can include one or more of a number of components (e.g., transceiver, antenna, switch, power module) and/or have the functionality described below with respect to a controller 104 and/or an associated electrical device 102. For example, a communication device 190 can include a control engine, a transceiver, and an antenna to allow the communication device 190 to send communication signals 195 to and/or receive communication signals 195 from one or more electrical devices 102 in the system 100.

Using example embodiments, a communication device 190 of an object 160 can be in sleep mode for a predefined interval, at which point it stays awake for a period of time or until the communication device 190 receives a communication signal 195 (e.g., a RF signal) broadcast by one or more electrical devices 102. When this occurs, the communication device 190 can turn on long enough to interpret the initial (received) communication signal 195, and then generate and send its own subsequent communication signal 195 (e.g., another RF signal) to one or more of the electrical devices 102 in response to the initial communication signal 195. This response communication signal 195 can include a UUID (or other form of identification) as well as a reference (e.g., signal code) to the initial communication signal 195 and/or the electrical device 102 that sent the initial communication signal 195, if any. The identification of the object 160 or communication device 190 thereof) included with the RF signal 195 sent by the communication device 190 can be 24 or 48 bits. Once the response communication signal 195 is sent by a communication device 190, the communication device 190 can go back into sleep mode, thereby reserving a considerable amount of power.

The communication device 190 can use one or more of a number of communication protocols in sending communication signals 195 to and/or receiving communication signals 195 from the electrical devices 102. In certain example embodiments, an object 160 (or a portion thereof, such as the communication device 190) can include a battery (a form of power supply or power module) that is used to provide power, at least in part, to some or all of the rest of the object 160, including the communication device 190.

A user 150 (including an associated user system 155), the network manager 180, one or more sensor devices 165, one or more WACs 185, and/or the other electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to the user 150 (including an associated user system 155), the network manager 180, the sensor devices 165, one or more WACs 185, and/or one or more of the other electrical devices 102-N. The user 150 (including an associated user system 155), the network manager 180, the sensor devices 165, one or more WACs 185, and/or one or more of the other electrical devices 102-N can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150 (including an associated user system 155), the network manager 180, the sensor devices 165, one or more WACs 185, and/or one or more of the other electrical devices 102-N can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within or in communication with the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment, a wet environment). The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the one or more sensor devices 165, an optional switch 145, one or more optional antennae 175, the power supply 140, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with the user 150 (including a user system 155), the network manager 180, one or more of the objects 160, the sensor devices 165, one or more WACs 185, and one or more of the other electrical devices 102-N within the system 100. In one or more example embodiments, the storage repository 130 stores one or more protocols 132, one or more algorithms, 133, and object data 134.

The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and the user 150 (including an associated user system 155), the network manager 180, the one or more of the other electrical devices 102-N, the sensor devices 165, one or more WACs 185, and one or more of the objects 160 (including an associated communication device 190). One or more of the protocols 132 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 used for communication can provide a layer of security to the data transferred within the system 100.

The algorithms 133 can be any formulas, mathematical models, forecasts, simulations, and/or other similar tools that the control engine 106 of the controller 104 uses to reach a computational conclusion. An example of one or more algorithms 133 is calculating the strength of a communication signal 195 and comparing the strength of a communication signal 195 with a threshold value. Algorithms 133 can be used to analyze past data, analyze current data, and/or perform forecasts.

One or more particular algorithms 133 can be used in conjunction with one or more particular protocols 132. For example, one or more protocols 132 and one or more algorithms 133 can be used in conjunction with each other to track an object 160 (including an associated communication device 190) using occupancy information measured by one or more sensor devices 165. As another example, one or more protocols 132 and one or more algorithms 133 can be used in conjunction with each other to track an object 160 (including an associated communication device 190) using encoded IR signaling, which can involve one or more sensor devices 165. As still another example, one or more protocols 132 and one or more algorithms 133 can be used in conjunction with each other to track an object 160 (including an associated communication device 190) based on a temporal separation of objects 160 based on a received signal strength indicator (RSSI), which can be measured by one or more sensor devices 165.

As yet another example, one or more protocols 132 and one or more algorithms 133 can be used in conjunction with each other to retrieve the identification of an object 160 (including potentially an associated communication device 190) from a communication signal 195 received from the communication device 190, generate an alternative identification for the object 160 (including potentially an associated communication device 190), populate a table of identifications of objects 160 with the original identification and the alternative identification for the object 160 (including potentially an associated communication device 190), and send a subsequent communication signal 195 using the alternative identification.

Object data 134 can be any data associated with each object 160 (including an associated communication device 190) that is communicably coupled to the controller 104. Such data can include, but is not limited to, a manufacturer of the object 160, a model number of the object 160 (including an associated communication device 190), communication capability of the communication device 190 of an object 160, last known location of the object 160, and age of the object 160. The storage repository 130 can also store one or more other types of data, including but not limited to preferences of a user 150, threshold values, tables (e.g., identification tables), results from algorithms 133, historical data (e.g., measurements of sensor devices 165), and nameplate information for equipment (e.g., sensor devices 165, electrical device components 142).

Examples of a storage repository 130 can include, but are not limited to, a database (or a number of databases), a file system, a hard drive, flash memory, cloud-based storage, some other form of solid state data storage, or any suitable combination thereof. The storage repository 130 can be located on multiple physical machines, each storing all or a portion of the protocols 132, the algorithms 133, and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with a user 150 (including an associated user system 155), the network manager 180, the objects 160 (including an associated communication device 190), the sensor devices 165, one or more WACs 185, and the other electrical devices 102-N in the system 100. More specifically, the control engine 106 sends information to and/or receives information from the storage repository 130 in order to communicate with a user 150 (including an associated user system 155), the network manager 180, the objects 160 (including an associated communication device 190), the sensor devices 165, one or more WACs 185, and the other electrical devices 102-N. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can put the communication module 108 in "sleep" mode when there are no communications between the controller 104 and another component (e.g., an object 160 (including an associated communication device 190), a sensor device 165, a WAC 185, a user system 155) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to send communication signals 195 (e.g., RF signals) and/or stop sending communication signals 195 to one or more sensor devices 165 and/or one or more WACs 185 in the system 100. The control engine 106 can also instruct a sensor device 165 to communicate with an object 160 (including an associated communication device 190 thereof), with a WAC 185, with the network manager 180, and/or with the controller 104. This example provides another instance where the control engine 106 can conserve power used by the controller 104 and other components (e.g., a communication device 190 of an object 160, the sensor devices 165) of the system 100.

The control engine 106 can determine when to broadcast one or more communication signals 195 in an attempt to locate an object 160 (including an associated communication device 190). To conserve energy, the control engine 106 does not constantly broadcast communication signals 195, but rather only does so at discrete times. The control engine 106 can broadcast a communication signal 195 based on one or more of a number of factors, including but not limited to passage of time, the occurrence of an event, instructions from a user 150 (including an associated user system 155), and a command received from the network manager 180. The control engine 106 can coordinate with the controllers 104 of one or more of the other electrical devices 102-N and/or directly control one or more of the other electrical devices 102-N to broadcast multiple communication signals 195. The control engine 106 can also determine the signal strength (e.g., RSSI) of one or more of the communication signals 195 that are broadcast by the communication device 190 of an object 160, in some cases in response to the communication signal 195 broadcast by the electrical device 102-1.

In some cases, the control engine 106 of the electrical device 102-1 (or, in some cases, the network manager 180 communicating with the controller 104) can locate the object 160 (including an associated communication device 190) based on the multiple communication signals 195 sent by the communication device 190 of the object 160, in some cases in response to the multiple communication signals 195 broadcast by the electrical devices 102. To accomplish this, the control engine 106 obtains the multiple communication signals 195 (directly and/or from another control engine 106 from one or more of the other electrical devices 102-N) broadcast by the communication device 190 of an object 160 and uses one or more protocols 132 and/or algorithms 133 to determine the location of the object 160 (including the associated communication device 190).

For example, the protocols 132 and/or algorithms 133 used by the control engine 106 can track an object 160 (including an associated communication device 190) using occupancy information, a detailed example of which is shown in FIGS. 6A and 6B below. As another example, the protocols 132 and/or algorithms 133 used by the control engine 106 can track an object 160 (including an associated communication device 190) using encoded IR signaling. As yet another example, the protocols 132 and/or algorithms 133 used by the control engine 106 can track an object 160 using a temporal separation of objects 160 based on RSSI.

As still another example, the control engine 106 of the controller 104 can use one or more protocols 132 and one or more algorithms 133 to retrieve the identification of an object 160 (including potentially an associated communication device 190) from a communication signal 195 received from the communication device 190, generate an alternative identification for the object 160 (including potentially an associated communication device 190), populate a table of identifications of objects 160 with the original identification and the alternative identification for the object 160 (including potentially an associated communication device 190), and send (e.g., to a WAC 185, to the network manager 180) a subsequent communication signal 195 using the alternative identification. These example embodiments have the advantages of using less bandwidth of data and improving accuracy relative to currently-used technology and/or methods. When used for RTLS, the system 100 can locate one or more objects 160 in the volume of space 199 in two or three dimensions.

The control engine 106 of the controller 104 can also use the protocols 132 and/or the algorithms 133 to extract the identification (e.g., the original identification, an alternative identification) of an object 160 from a communication signal 195 (e.g., RF signal) received from the communication device 190 of the object 160 directly by the transceiver 124 or by another electrical device 102-N (e.g., an integrated sensor device 165). The control engine 106 of the controller 104 can also use the storage repository 130, the protocols 132, and/or the algorithms 133 to determine if the ID of the object 160 (including an associated communication device 190) is part of a list (e.g., a table) of identifications associated with the object 160 (including an associated communication device 190). Such a table can be used, for example, to determine whether subsequent communication generated by the control engine 106 is sent to a WAC 185 and/or the network manager 180.

The control engine 106 of the controller 104 can further use the protocols 132 and/or the algorithms 133 to interpret the measurements made by one or more of the sensors of a sensor module 165. For instance, if a sensor device 165 includes a PIR sensor, then the PIR sensor can detect motion within a sensing range and/or occupancy within a RTLS occupancy zone. In such a case, the control engine 106 can interpret these detections by the PIR sensor.

The control engine 106 of the controller 104 can also use the protocols 132 and/or the algorithms 133 to generate a subsequent communication signal 195 (e.g., a RF signal) to a WAC 185 that is based on receipt of the first communication signal. For example, a subsequent communication signal can include a number of bits that are directed to information such as, for example, the identification of the object 160 (including the associated communication device 190), the identification of a sensor device 165, and the RSSI of the communication signal 195 (e.g., RF signal) received by the sensor device 165.

In some cases, control engine 106 of the controller 104 can further use the protocols 132 and/or the algorithms 133 to determine whether a certain amount of time (e.g., a threshold value of time) has passed since a communication signal 195 involving an object 160 (including an associated communication device 190) has been received. In such a case, the control engine 106 can purge the record of the original identification and/or the alternative identification of the object 160 (including the associated communication device 190).

In some cases, a controller of a WAC 185 and/or the network manager 180 (as opposed to the controller 104 of the electrical device 102-1) can generate and/or maintain one or more tables that contain the original identification and a shorter alternative identification for each object 160 in the volume of space 199. In such a case, the controller of the WAC 185 and/or the network manager 180 can generate the alternative identification for an object 160, designate a hierarchy or priority of objects 160, track the amount of time (e.g., using the timer 110) since the last communication received from a particular object 160, and/or any other information associated with an object 160. All of this information can be inserted into a table, and the controller of the WAC 185 and/or the network manager 180 can push the table (or relevant portions thereof) to the controller 104 of the electrical device 102-1. As a table is updated, these updates can also be pushed from the WAC 185 and/or the network manager 180 to the controller 104 of the electrical device 102-1.

The original identification of an object 160 can be a certain size (e.g., 6 bytes (48 bits), 3 bytes (24 bits)). This identification can sometimes be called a media access control (MAC) address or MAC identification. In certain example embodiments, the alternative identification generated by a control engine 106 of a controller 104 (e.g., of the network manager 180, of a WAC 185, of the electrical device 102-1) can be a size (e.g., 8 bits, 9 bits, 10 bits, 11 bits) that is smaller than the size of the original identification. This alternative identification can sometimes be called a system MAC (SMAC) address or a SMAC identification.

In maintaining a table, the control engine 106 of the controller 104 (e.g., of the network manager 180, of a WAC 185, of the electrical device 102-1) can purge line items (e.g., identification information associated with an object 160) due to inactivity, a new location of the object 160, a reorganization of the objects 160 by a user 150, a new protocol for establishing the alternative identification (e.g., using fewer bits, using more bits), and/or for some other reason.

The control engine 106 can provide control signals, communication signals 195, and/or other signals to a user 150 (including an associated user system 155), the network manager 180, the other electrical devices 102-N, the sensor devices 165, one or more WACs 185, and one or more of the objects 160 (including associated communication devices 190). Similarly, the control engine 106 can receive control signals, communication signals 195, and/or other signals from a user 150 (including an associated user system 155), the network manager 180, the other electrical devices 102-N, the sensor devices 165, one or more WACs 185, and one or more of the objects 160 (including associated communication devices 190). The control engine 106 can communicate with each object 160 (including an associated communication device 190) automatically (for example, based on one or more algorithms 133 stored in the storage repository 130) and/or based on control signals, communication signals 195, and/or other signals received from another device (e.g., the network manager 180, another electrical device 102). The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and a user 150 (including an associated user system 155), the network manager 180, the other electrical devices 102-N, the sensor devices 165, one or more WACs 185, and the objects 160 (including associated communication devices 190).

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I$^2$C), and a pulse width modulator (PWM).

By using example embodiments, while at least a portion (e.g., the control engine 106, the timer 110) of the controller 104 is always on, the remainder of the controller 104 and the communication devices 190 of the objects 160 can be in sleep mode when they are not being used. In addition, the controller 104 can control certain aspects (e.g., sending communication signals 195 to and receiving communication signals 195 from the communication device 190 of an object 160) of one or more other electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and a user 150 (including an associated user system 155), the network manager 180, the sensor devices 165, one or more WACs 185, the communication devices 190 of the objects 160, and the other electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) a user 150 (including an associated user system 155), the network manager 180, the other electrical devices 102-N, the sensor devices 165, one or more WACs 185, and/or one or more of the objects 160 (including the communication devices 190). In some cases, the communication module 108 accesses the object data 134 to determine which protocol 132 for communication is within the capability of the communication device 190 of an object 160 for a communication signal 195 sent by the control engine 106. In addition, the communication module 108 can interpret the protocol 132 for communication of a communication signal 195 (e.g., a RF signal) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure the time of flight (ToF) of one or more RF signals 195, even simultaneously. The timer 110 can track time periods based on an instruction received from the control engine 106, based on an instruction received from the user 150 (including a user system 155), based on an instruction programmed in the software for the controller 104, based on the last instance that a communication signal 195 was received from a particular communication device 190 of an object 160, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to one or more other components (e.g., the power supply 140, a sensor device 165, an electrical device component 142) of the electrical device 102-1. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102-1 and generates power of a type (e.g., alternating current, direct current) and level (e.g., 12V, 24V, 120V) that can be used by the other components of the controller 104 and/or by another component of the electrical device 102-1. In addition, or in the alternative, the power module 112 can be a source of power in itself to provide signals to the other components of the controller 104 and/or another component of the electrical device 102-1. For example, the power module 112 can include an energy storage device (e.g., a battery). As another example, the power module 112 can include a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by a user 150 (including an associated user system 155), the network manager 180, the sensor devices 165, one or more WACs 185, the communication devices 190 of the objects 160, and/or one or more of the other electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send (using a transmitter) and/or receive (using a receiver) control and/or communication signals 195 (e.g., RF signals). Specifically, the transceiver 124 can be used to transfer data between the controller 104 and a user 150 (including an associated user system 155), the network manager 180, the other electrical devices 102-N, one or more of the sensor devices 165, one or more WACs 185, and/or the objects 160 (including associated communication devices 190). The transceiver 124 can use wired and/or wireless technology. The transceiver 124 can be configured in such a way that the control and/or communication signals 195 sent and/or received by the transceiver 124 can be received and/or sent by another transceiver that is part of a user 150 (including an associated user system 155), the network manager 180, the other electrical devices 102-N, one or more sensor devices 165, one or more WACs 185, and/or the objects 160 (including associated communication devices 190).

When the transceiver 124 uses wireless technology, any type of wireless technology can be used by the transceiver 124 in sending and receiving signals (e.g., communication signals 195). Such wireless technology can include, but is not limited to, Wi-Fi, visible light communication, infrared (IR), cellular networking, Zigbee, BLE, and Bluetooth. For example, the transceiver 124 can include a Zigbee transmitter, a Zigbee receiver, a BLE receiver, a BLE transmitter, an active IR transmitter, and/or an active IR receiver. The transceiver 124 can use one or more of any number of suitable communication protocols (e.g., ISA100, HART) when sending and/or receiving signals, including communication signals 195. Such communication protocols can be stored in the protocols 132 of the storage repository 130. Further, any transceiver information for a user 150 (including an associated user system 155), the network manager 180, the other electrical devices 102-N, the sensor devices 165, one or more WACs 185, and/or the objects 160 (including associated communication devices 190) can be part of the object data 134 (or similar areas) of the storage repository 130.

Optionally, in one or more example embodiments, the security module 128 secures interactions between the controller 104, a user 150 (including an associated user system 155), the network manager 180, the other electrical devices 102-N, the sensor devices 165, one or more WACs 185, and/or the objects 160 (including associated communication devices 190). More specifically, the security module 128 authenticates communication from software based on security keys verifying the identity of the source of the communication. For example, user software may be associated with a security key enabling the software of a user system 155 of a user 150 to interact with the controller 104 of the electrical device 102-1. Further, the security module 128 can restrict receipt of information, requests for information, and/or access to information in some example embodiments.

As mentioned above, aside from the controller 104 and its components, the electrical device 102-1 can include a power supply 140, one or more sensor devices 165, one or more optional antennae 175, an optional switch 145, and one or more electrical device components 142. The electrical device components 142 of the electrical device 102-1 are devices and/or components typically found in the electrical device 102-1 to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 can provide power to one or more of the electrical device components 142, one or more of the sensor devices 165, the optional switch 145, and/or the optional antennae 175. The power supply 140 can be substantially the same as (e.g., in terms of functionality, in terms of components), or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply 140 can generate power of a type (e.g., alternating current, direct current) and level (e.g., 12V, 24V, 120V) that can be used by the recipients (e.g., the electrical device components 142, the controller 104) of such power. In addition, or in the alternative, the power supply 140 can receive power from a source (e.g., AC mains, an electrical outlet) external to the electrical device 102-1. In addition, or in the alternative, the power supply 140 can be or include a source of power in itself. For example, the power supply 140 can include an energy storage device (e.g., a battery), a localized photovoltaic power system, or some other source of independent power.

Each of the one or more sensor devices 165 of the electrical device 102-1 can include any type of sensor that measures one or more parameters. Examples of types of sensors of sensor devices 165 can include, but are not limited to, a passive infrared sensor, a photocell, a pressure sensor, an air flow monitor, a gas detector, and a resistance temperature detector. Examples of a parameter that is measured by a sensor of a sensor device 165 can include, but are not limited to, occupancy in the volume of space 199, motion in the volume of space 199, a temperature, a level of gas, a level of humidity, an amount of ambient light in the volume of space 199, and a pressure wave. A sensor device 165 can have one sensor or multiple sensors.

In some cases, the parameter or parameters measured by a sensor of a sensor device 165 can be used to operate one or more of the electrical device components 142 of the electrical device 102-1. In addition, or in the alternative, the one or more parameters measured by a sensor of a sensor device 165 can be used to locate one or more objects 160 in accordance with certain example embodiments. For example, if a sensor device 165 is configured to detect the presence of an object 160 (including an associated communication device 190), that information can be used to determine whether a communication (e.g., a communication signal 195) received from a communication device 190 of an object 160 should be forwarded to the network manager 180.

In some cases, a sensor device 165 can be an integrated sensor device 165, which can be considered a type of electrical device 102. An integrated sensor device 165 has both the ability to sense and measure at least one parameter and the ability to independently communicate with another component (e.g., the communication device 190 of an object 160, a WAC 185). The communication capability of an integrated sensor device 165 can include one or more communication devices that are configured to communicate with, for example, the controller 104 of the electrical device 102-1, a WAC 185, and/or a controller (substantially similar to the controller 104 described herein) of another electrical device 102-N. For example, an integrated sensor device 165 can include a sensor that is a passive infrared (PIR) sensor, a transceiver that sends and receives signals (e.g., communication signals 195) using Zigbee, a receiver that receives signals (e.g., communication signals 195) using BLE, and a receiver that actively receives IR signals. In such a case, the PIR sensor measures IR light radiating from objects 160 in its field of view, often for the purpose of detecting motion.

Each integrated sensor device 165 can use one or more of a number of communication protocols. This allows an integrated sensor device 165 to communicate with one or more components (e.g., a communication device 190 of an object 160, a WAC 185, one or more other integrated sensor devices 165) of the system 100. The communication capability of an integrated sensor device 165 can be dedicated to the sensor device 165, shared with one or more other sensor devices 165 that are not integrated, and/or shared with the controller 104 of the electrical device 102-1. When the system 100 includes multiple integrated sensor devices 165, one integrated sensor device 165 can communicate, directly or indirectly, with one or more of the other integrated sensor devices 165 in the system 100.

If the communication capability of an integrated sensor device 165 is dedicated to the integrated sensor device 165, then the integrated sensor device 165 can include one or more components (e.g., memory 122, a storage repository 130, a transceiver 124, a communication module 108), or portions thereof, that are substantially similar to the corresponding components described above with respect to the controller 104. A sensor device 165 (whether integrated or not) can be associated with the electrical device 102-1 and/or another electrical device 102 in the system 100. A sensor device 165 (whether integrated or not) can be located within the housing 103 of the electrical device 102-1, disposed on the housing 103 of the electrical device 102-1, or located outside the housing 103 of the electrical device 102-1.

In certain example embodiments, a sensor device 165 (whether integrated or not) can include an energy storage device (e.g., a battery) that is used to provide power, at least in part, to some or all of the sensor device 165. In such a case, the energy storage device can be the same as, or independent of, an energy storage device or other power supply 140 of the electrical device 102-1. The optional energy storage device of the sensor module 165 can operate at all times or when the power supply of the electrical device 102-1 is interrupted. The controller 104 can provide the functionality of these components used by the sensor device 165. Alternatively, the sensor device 165 can be integrated and include, either on its own or in shared responsibility with the controller 104, one or more of the components of the controller 104. In such a case, the integrated sensor device 165 can correspond to a computer system as described below with regard to FIG. 2. An example of an integrated sensor device is shown below with respect to FIG. 9.

As discussed above, the electrical device 102 can include one or more optional antennae 175. An antenna 175 is an electrical device that converts electrical power to communication signals 195 (e.g., RF signals) (for transmitting) and communication signals 195 to electrical power (for receiving). In transmission, a radio transmitter (e.g., transceiver 124) supplies, through the optional switch 145 when multiple antenna 175 are involved, an electric current oscillating at radio frequency (i.e. a high frequency alternating current (AC)) to the terminals of the antenna 175, and the antenna 175 radiates the energy from the current as signals (e.g., communication signals 195). In reception, an antenna 175, when included in the electrical device 102, intercepts some of the power of communication signals 195 in order to produce a tiny voltage at its terminals, that is applied to a receiver (e.g., transceiver 124), in some cases through an optional switch 145, to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse communication signal 195 (often an electromagnetic field wave). Conversely, during reception, the oscillating electric and magnetic fields of an incoming communication signal 195 exert force on the electrons in the body of the antenna 175, causing portions of the body of the antenna 175 to move back and forth, creating oscillating currents in the antenna 175.

In certain example embodiments, an antenna 175 can be disposed at, within, or on any portion of the electrical device 102-1. For example, an antenna 175 can be disposed on the housing 103 of the electrical device 102-1 and extend away from the electrical device 102-1. As another example, an antenna 175 can be insert molded into a lens of the electrical device 102-1. As another example, an antenna 175 can be two-shot injection molded into the housing 103 of the electrical device 102-1. As yet another example, an antenna 175 can be adhesive mounted onto the housing 103 of the electrical device 102-1. As still another example, an antenna 175 can be pad printed onto a circuit board within the cavity 101 formed by the housing 103 of the electrical device 102-1. As yet another example, an antenna 175 can be a chip ceramic antenna that is surface mounted. As still another example, an antenna 175 can be a wire antenna.

When there are multiple antennae 175 (or other forms of multiple communication points) as part of the electrical device 102-1, there can also be an optional switch 145, which allows for selection of one communication point at a given point in time. In such a case, each antenna 175 can be electrically coupled to the switch 145, which in turn is electrically coupled to the transceiver 124. The optional switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state (position) and a closed state (position).

In the open state, a contact of the switch 145 creates an open circuit, which prevents the transceiver 124 from delivering a communication signal 195 to or receiving a communication signal 195 from the antenna 175 electrically coupled to that contact of the switch 145. In the closed state, a contact of the switch 145 creates a closed circuit, which allows the transceiver 124 to deliver a communication signal 195 to or receive a communication signal 195 from the antenna 175 electrically coupled to that contact of the switch 145. In certain example embodiments, the position of each contact of the switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
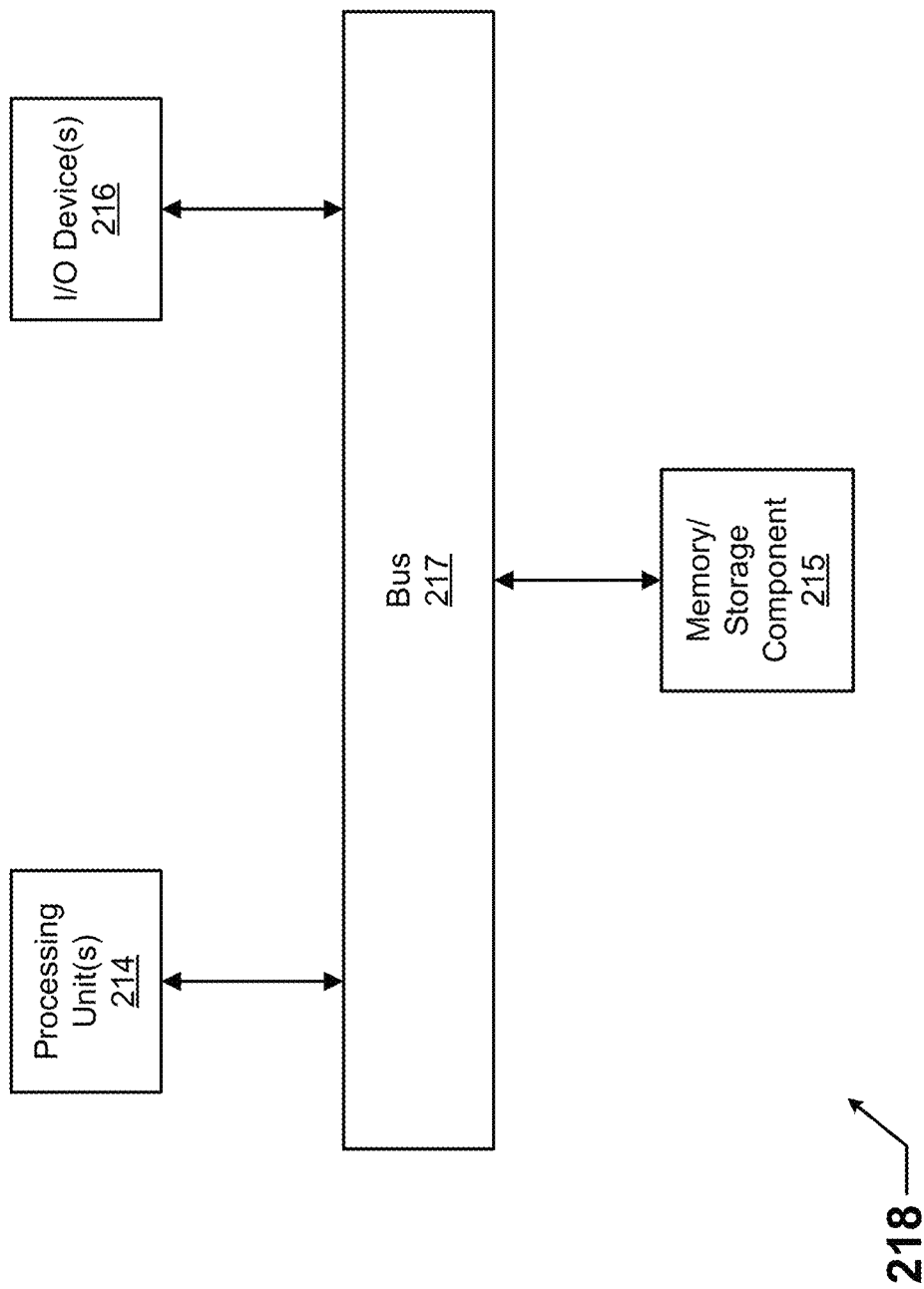
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102-1 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
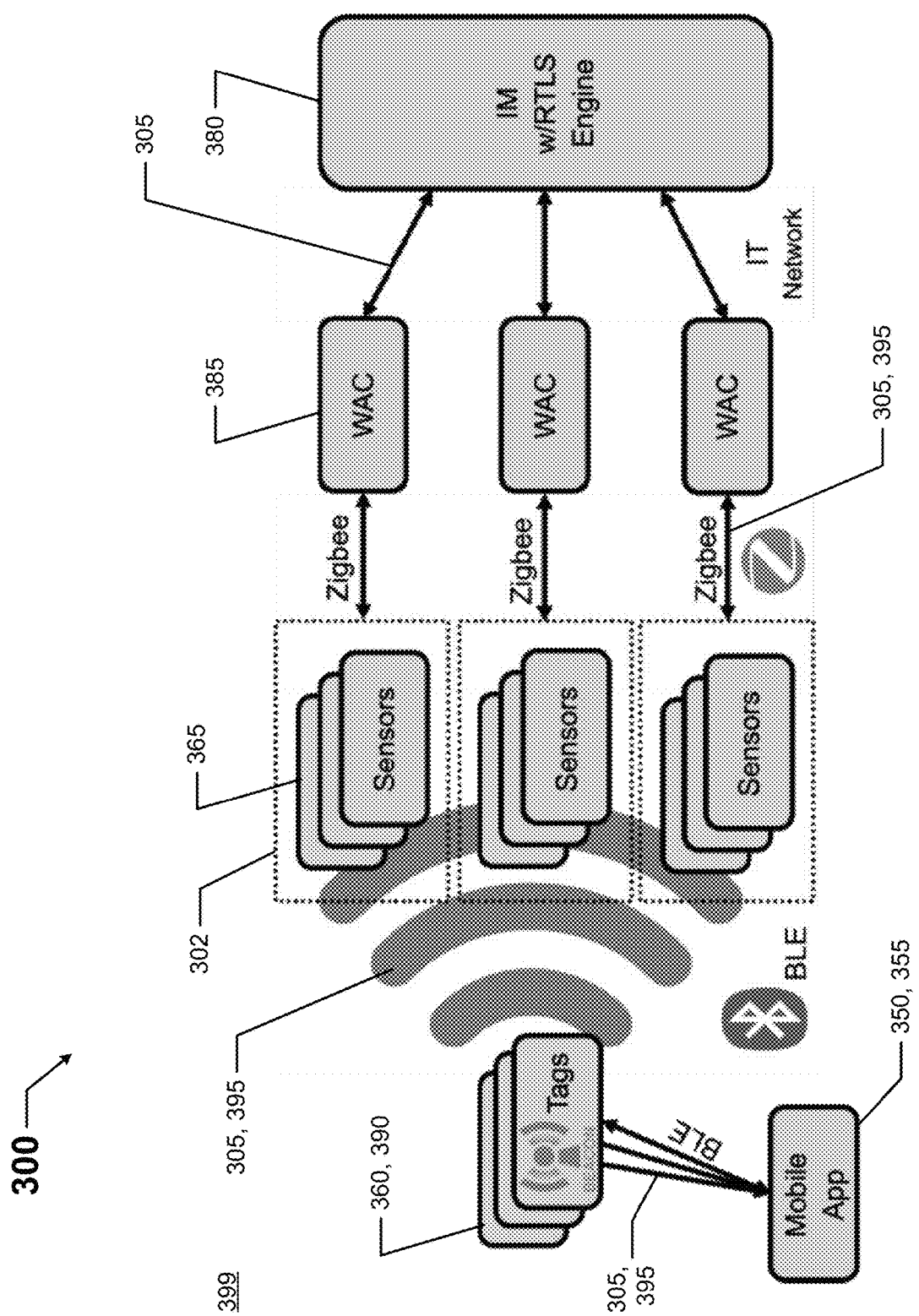
FIG. 3 shows a diagram of another system in accordance with certain example embodiments.

FIG. 3 shows a diagram of another RTLS system 300 in accordance with certain example embodiments. Referring to FIGS. 1 through 3, the RTLS system 300 includes a user 350 with a user system 355, multiple objects 360 each having a communication device 390 (in this case called a tag), a number of electrical devices 302 each having one or more sensor devices 365, a number of controllers 385 (in this case called wireless access controllers (WACs)), and a network manager 380 (in this case called an insight manager (IM) with a RTLS engine). Each of these components of the system 300 of FIG. 3 can be substantially the same as the corresponding component of the RTLS system 100 of FIG. 1. For example, each sensor device 365 can include a Zigbee-enabled transceiver, a BLE-enabled receiver, a PIR sensor, and an active IR receiver.

In this particular case, the communication devices 390 of the objects 360 are the physical entities that are tracked by the RTLS system 300. From the perspective of a user 350, each communication device 390 is associated with an object 360 (also sometimes called an asset). In this example, the communication devices 390 use BLE (a form of communication link 305 to "beacon" RF signals 395 at a certain rate. A beacon is a broadcast message that, at a minimum, identifies the object 360 associated with the sending communication device 390. The integrated sensor device 365 receives these RF signals 395 over the BLE-enabled communication links 305 and measures the RSSI along with other data included in the RF signal 395.

This RSSI information is the key piece of data in a RF signal 390 that allows a controller 385 and/or network manager 380 to locate, in real time, the communication device 390 (and corresponding object 360) within a volume of space 399 (e.g., in X-Y coordinates, in X-Y-Z coordinates). As used herein, "real time" refers to a user's perspective of the system and means that objects can be located within the time in which the signals are transmitted and processed, such as a few milliseconds to within a few seconds, which time is virtually real time from the user's perspective. Integrated sensor devices 365 communicate with one or more controllers 385 (in this example, WACs 385) using Zigbee-enabled communication links 305. In this case, an integrated sensor device 365 is a Zigbee-enabled device as well as a BLE-enabled device, and so a sensor device 365 can be paired with a single WAC 385.

Communications between a sensor device 365 and a WAC 385 can be limited by one or more of a number of factors. For example, the bandwidth by existing Zigbee (or other communication method) protocols for the communication link(s) 305 between the sensor device 365 and the WAC 385 can limit communications capability. As another example, the capability (e.g., messages per second) of the WAC 385 can limit communications capability. As yet another example, the overall communication activity on the Zigbee-enabled communication links 305, involving all sensor device 365 and WACs 385 at a given point in time, can limit communications capability. With all of these potential constraints, intelligent use of the Zigbee-enabled communication links 305 is fundamental to the success of the RTLS system 300 in locating an object 360 accurately in real time.

The WACs 385, upon receiving the signals from the sensor devices 365 on the Zigbee-enabled communication links 305, send the information in these signals to the network manager 380, which process all of this information (e.g., using one or more algorithms 133) to locate each object 360 within the volume of space 399 in real time. The network manager 380 can store this information and use it for trending analysis, predictive analysis, and/or any other analysis that may be useful.

BLE proximity methods are widely used in the industry to estimate the distance between a BLE transmitter (in this case, a communication device 390 of an object 360) and a BLE receiver (in this case, a sensor device 3650. In a dense and uniformly distributed infrastructure of electrical devices 302 (e.g., a lighting system), these methods can be optimized to achieve greater accuracy by comparing the RSSI at many BLE receivers and performing various calculations (by a WAC 385 or network manager 380) to estimate the location of an object 360.

Reasonable accuracy can be expected with these methods, but two significant challenges are encountered using BLE communication systems. First, the large number of electrical devices 302 (sensor devices 365 or nodes) creates large amounts of data, and the communication network of the system 300 has limited bandwidth. Not all data that is transmitted is useful in establishing the location of an object 360, and care must be taken to provide the best data possible to a WAC 385 or network manager 380 while still maintaining a healthy (e.g., not data constrained) network. In other words, the principal purpose (e.g., lighting) of the system 300 for which the electrical devices 302 is designed should not be affected by the efforts of the system 300 to also locate one or more objects 360 in real time.

Second, no matter how accurate the location estimations of objects 360 are, there can be challenges in achieving reliable room-level or even floor-level accuracy of locating an object 360 using RF signals 395 in the volume of space 399 because RF signals 395 (e.g., transmitted at 2.4 GHz in a BLE-enabled communication network) can penetrate barriers such as walls and floors. As a result, these barriers can cause the location of an object 360 to be falsely identified. Other location methods using example embodiments are needed to accurately locate objects 360 in real time in volumes of space that have such barriers and/or present other challenges to existing location methods.

Figure 4:
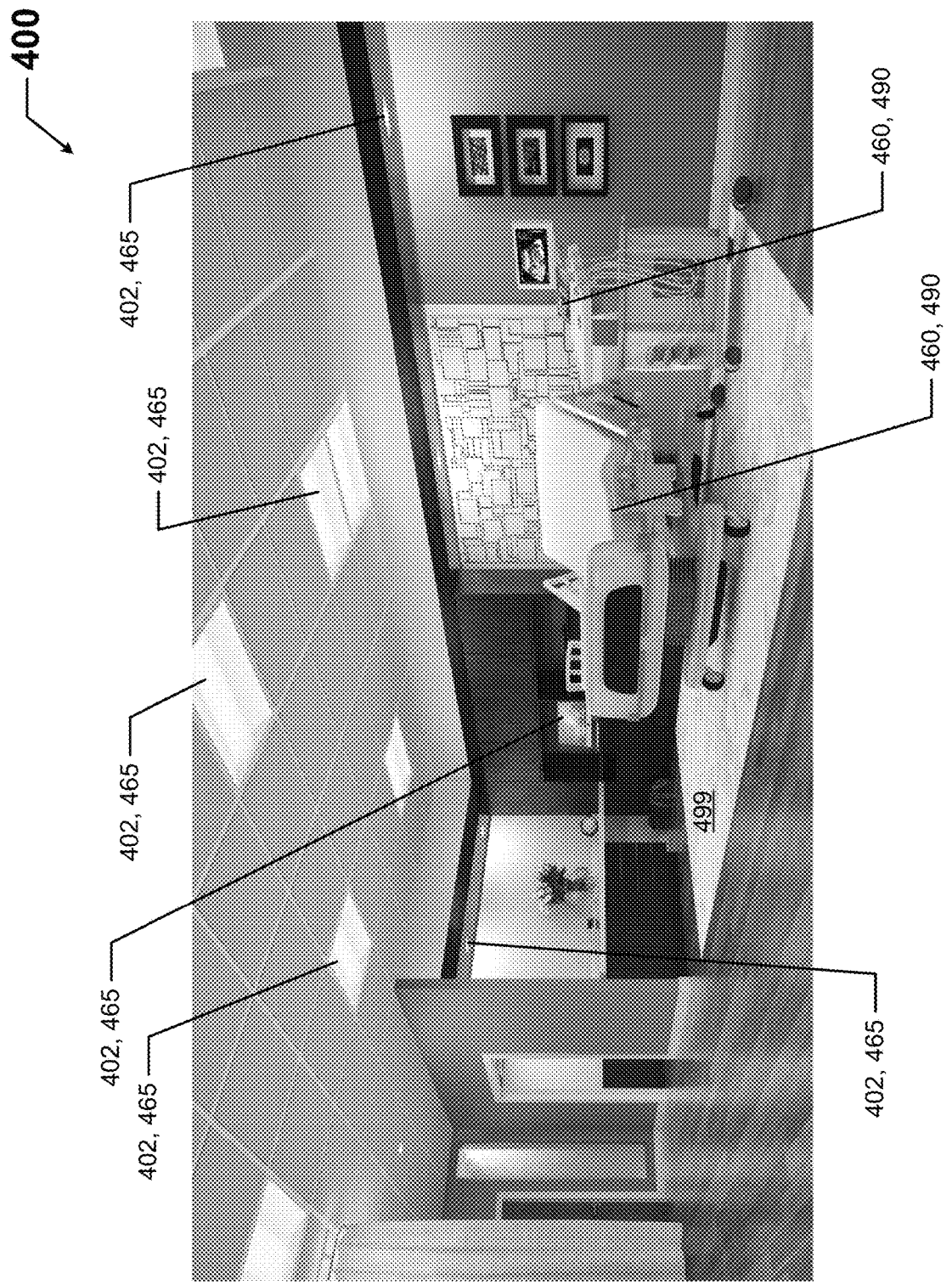
FIG. 4 shows a system in a healthcare environment in accordance with certain example embodiments.

FIG. 4 shows a system 400 that can be used for real-time location of an object 460 in accordance with certain example embodiments. Referring to FIGS. 1 through 4, the lighting system 400 includes a number of electrical devices 402, principally in the form of light fixtures, located in a volume of space 499 that includes a hospital room. A lighting system provides unique advantages for implementing an example RTLS because the density of the electrical devices (light fixtures) supports a dense network of sensors for locating and tracking objects.

Of the electrical devices 402 that are light fixtures, there are seven troffer light fixtures and five down can light fixtures disposed in the ceiling. There is also an electrical device 402 in the form of a computer monitor. In this case, each electrical device 402 includes a sensor device 465, substantially similar to the sensor devices 165 discussed above. There are also two objects 460 shown in FIG. 4. One object 460 is a test cart, and the other object 460 is a bed. Each object 460 in this case includes a communication device 490 that is capable of communicating with the electrical devices 402, including any integrated sensor devices 465.

Figure 5:
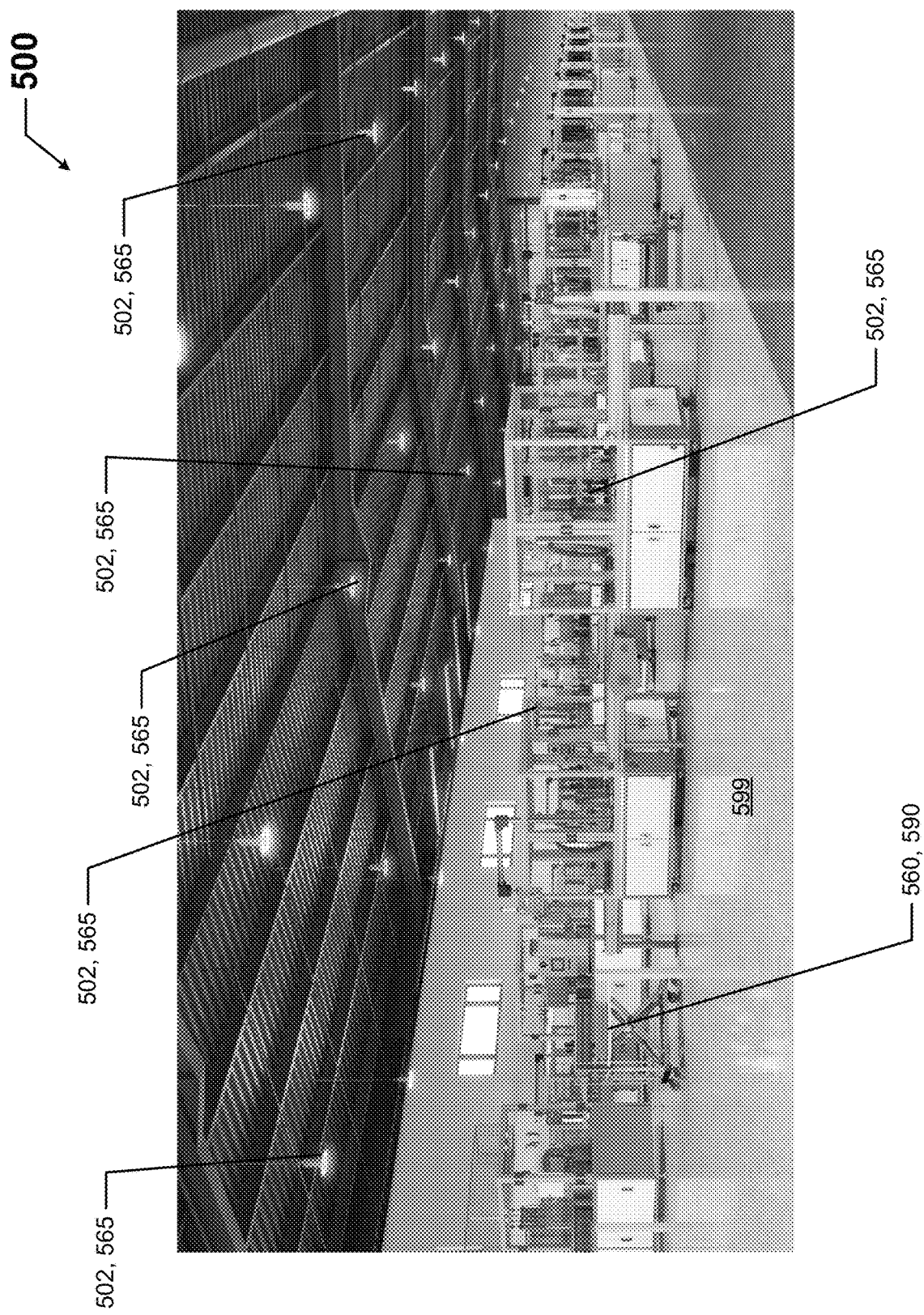
FIG. 5 shows another system in a manufacturing environment in accordance with certain example embodiments.

FIG. 5 shows another system 500 that can be used for real-time location of an object 560 in accordance with certain example embodiments. Referring to FIGS. 1 through 5, the lighting system 500 includes a number of electrical devices 502, principally in the form of light fixtures, located in a volume of space 599 that includes a manufacturing facility.

Of the electrical devices 502 that are light fixtures, there are at least 56 Hi-Bay light fixtures suspended from the ceiling and at least 30 work stations located on the floor. In this case, each electrical device 502 includes a sensor device 565, substantially similar to the sensor devices 165 discussed above. There is also an object 560 shown in FIG. 5 that is in the form of a cart. The object 560 in this case includes a communication device 590 that is capable of communicating with the electrical devices 502, including any integrated sensor devices 565.

FIGS. 6A and 6B show a side and top view, respectively, of a system 600 in which an object 660 (including its corresponding communication device 690) is located in volume of space 699 in accordance with certain example embodiments. Referring to FIGS. 1 through 6B, also located in the volume of space 699 of FIGS. 6A and 6B are three electrical devices 602 (specifically, electrical device 602-1, electrical device 602-2, and electrical device 602-3), where the electrical devices 602 are types of light fixtures and are substantially similar to the electrical devices 102 of FIG. 1 above. As discussed above, the volume of space 699 can be of any size and/or in any location. For example, the volume of space 699 can be one or more rooms in an office building.

As shown in FIGS. 6A and 6B, all of the electrical devices 602 can be located in the volume of space 699. Alternatively, one or more of the electrical devices 602 can be located outside the volume of space 699, as long as the RF signals (e.g., RF signals 195) sent by the transceiver (e.g., transceiver 124) of the light fixture 602 are received by the communication device 690 of the object 660, and as long as the RF signals (or other types of communication signals) sent by the communication device 690 of the object 660 are received by the transceiver of the corresponding electrical device 602, as applicable.

Each of the electrical devices 602 can include one or more sensor devices 665. In this example, electrical device 602-1 includes sensor device 665-1, electrical device 602-2 includes sensor device 665-2, and electrical device 602-3 includes sensor device 665-3. One or more of these sensor devices 665 can can be integrated sensor devices 665. In such a case, the BLE-enabled receiver of a sensor device 665, whether on its own or in conjunction with the controller (e.g., controller 104) of the light fixture 602, can determine the signal strength of the RF signals (e.g., communication signals 195) received from the communication device 690 of the object 660.

If the sensor devices 665 of the electrical devices 602 are used to communicate with the communication device 690 of the object 660, then it is the sensor devices 665 that have the broadcasts ranges 782. In such a case, sensor device 665-1 of 1 electrical device 602-1 has broadcast range 782-1 inside of which the sensor device 665-1 broadcasts signals (e.g., communication signals). Similarly, sensor device 665-2 of electrical device 602-2 has broadcast range 782-2 inside of which the sensor device 665-2 broadcasts signals, and sensor device 665-3 of electrical device 602-3 has broadcast range 782-3 inside of which the sensor device 665-3 broadcasts signals.

Figure 7:
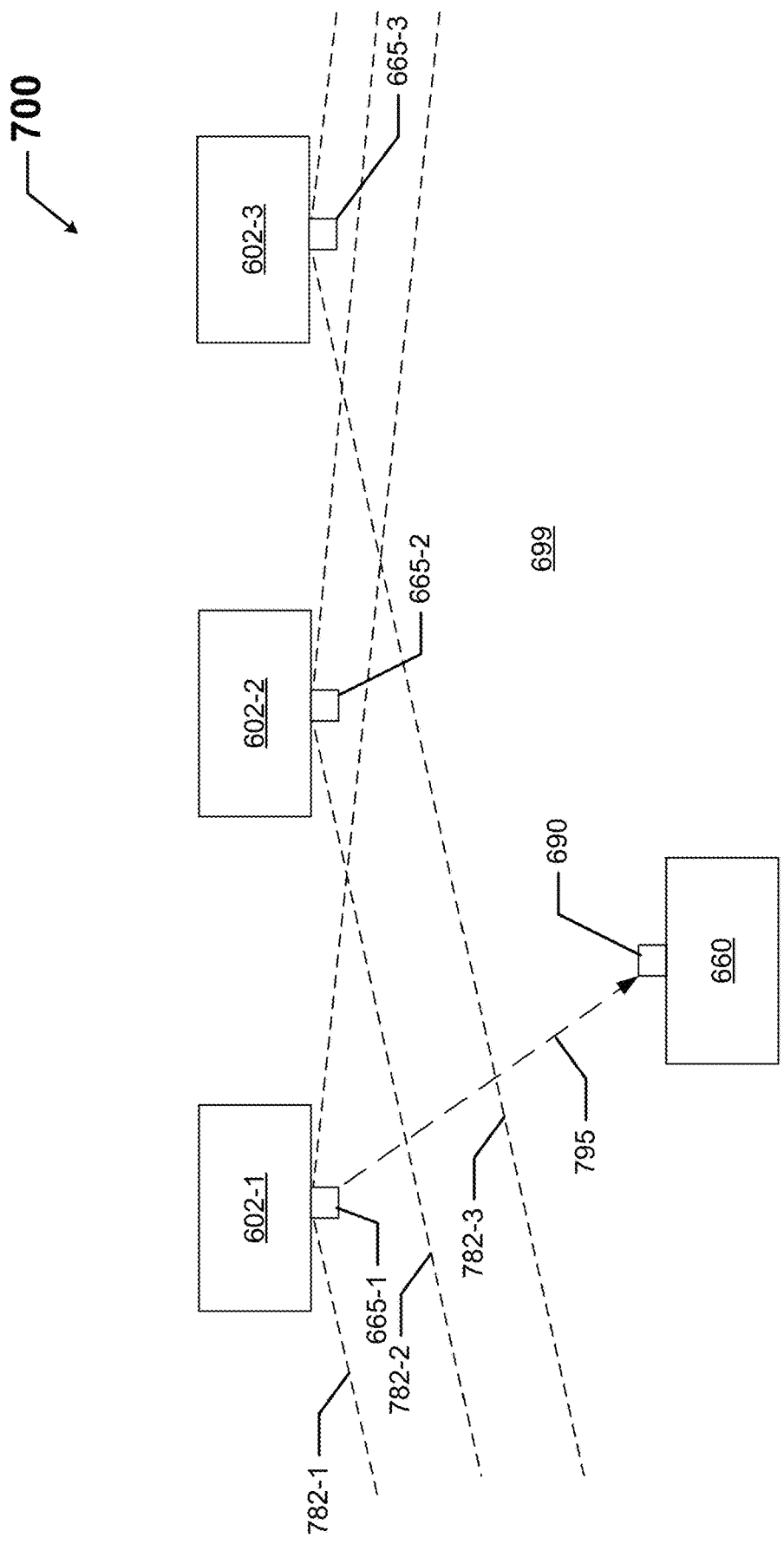
FIG. 7 shows the system of FIGS. 6A and 6B when a signal is sent by one of the light fixtures in accordance with certain example embodiments.

FIG. 7 shows the system 700 of FIGS. 6A and 6B when a RF signal 795 (a type of communication signal 195) is sent by one of the electrical devices 602 in accordance with certain example embodiments. Referring to FIGS. 1 through 7, electrical device 602-1 broadcasts a RF signal 795. Each electrical device 602 has a broadcast range 782. In this case, electrical device 602-1 has broadcast range 782-1, electrical device 602-2 has broadcast range 782-2, and electrical device 602-3 has broadcast range 782-3. Since the communication device 690 of the object 660 is located within the broadcast range 782-1 for light fixture 602-1, the communication device 690 of the object 660 receives RF signal 795.

In the event that the sensor devices 665 are used to communicate with the communication device 690 of the object 660, sensor device 665-1 can have broadcast range 782-1. In such a case, sensor device 665-1 can send (e.g., broadcast) RF signal 795 into the volume of space 699, and the communication device 690 of the object 660 receives the RF signal 795 because the communication device 690 of the object 660 is within the broadcast range 782-1. The RF signal 795 can be sent, as an example, using BLE.

Figure 8:
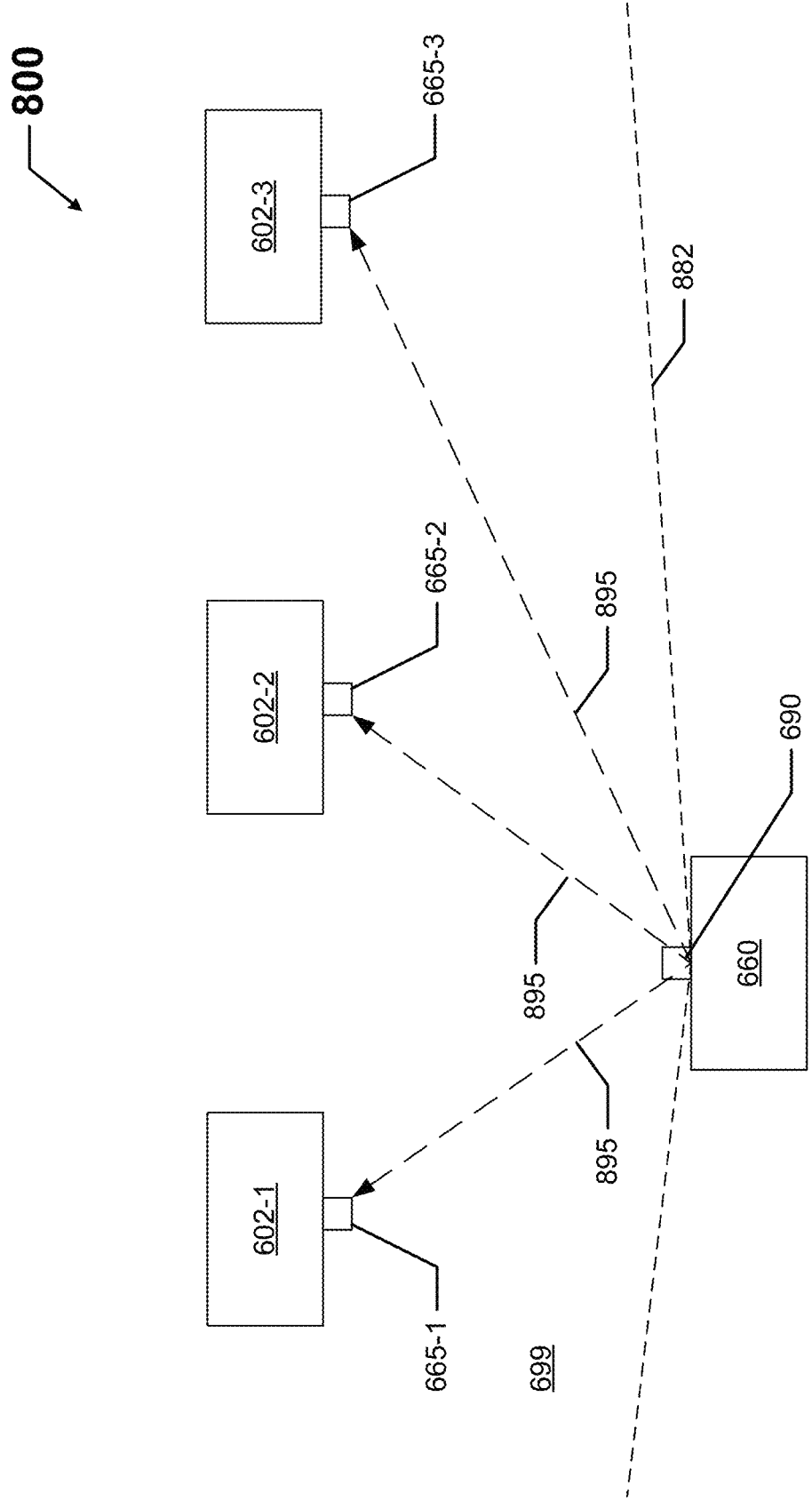
FIG. 8 shows the system of FIGS. 6A through 7 when a signal is sent by the object in accordance with certain example embodiments.

FIG. 8 shows the system 800 of FIGS. 6A through 7 when a RF signal 895 (another type of communication signal 895) is sent by the communication device 690 of the object 660 in accordance with certain example embodiments. Referring to FIGS. 1 through 8, the RF signal 895 sent by the communication device 690 of the object 660 can be in response to the RF signal 795 sent by electrical device 602-1, as shown in FIG. 7. Alternatively, the communication device 690 of the object 660 can send the RF signal 895 independent of any other component (e.g., an electrical device 602) or factor. As discussed above, the RF signal 895 broadcast by the communication device 690 of the object 660 can include the UUID of the object 660 (or portion thereof) as well as other code, such as, for example, identifying information of the light fixture 602-1 that sent the RF signal 795.

The communication device 690 of the object 660 has a broadcast range 882, and all three of the electrical devices 602 are located within the broadcast range 882 of the communication device 690 of the object 660. As a result, as shown in FIG. 8, all three of the electrical devices 602 receive the RF signal 895 broadcast by the communication device 690 of the object 660. When each electrical device 602 receives the RF signal 895 broadcast by the communication device 690 of the object 660, that electrical device 602 measures the signal strength (e.g., the RSSI value) of the RF signal 895.

For example, since the communication device 690 of the object 660 appears to be equidistant between electrical device 602-1 and electrical device 602-2, the signal strength of the RF signal 895 measured by electrical device 602-1 and electrical device 602-2 should be substantially the same. Also, since electrical device 602-3 is further away from the communication device 690 of the object 660 compared to electrical device 602-1 and electrical device 602-2, the signal strength of the RF signal 895 measured by electrical device 602-3 should be less than what is measured by electrical device 602-1 and electrical device 602-2.

As discussed above, in the event that the sensor devices 665 are used to communicate with the communication device 690 of the object 660, sensor device 665-1, sensor device 665-2, and sensor device 665-3 can each receive the RF signal 895 broadcast by the communication device 690 of the object 660 because sensor device 665-1, sensor device 665-2, and sensor device 665-3 area all within the broadcast range 882 of the communication device 690 of the object 660. The RF signal 895 can be sent, as an example, using BLE.

Figure 9:
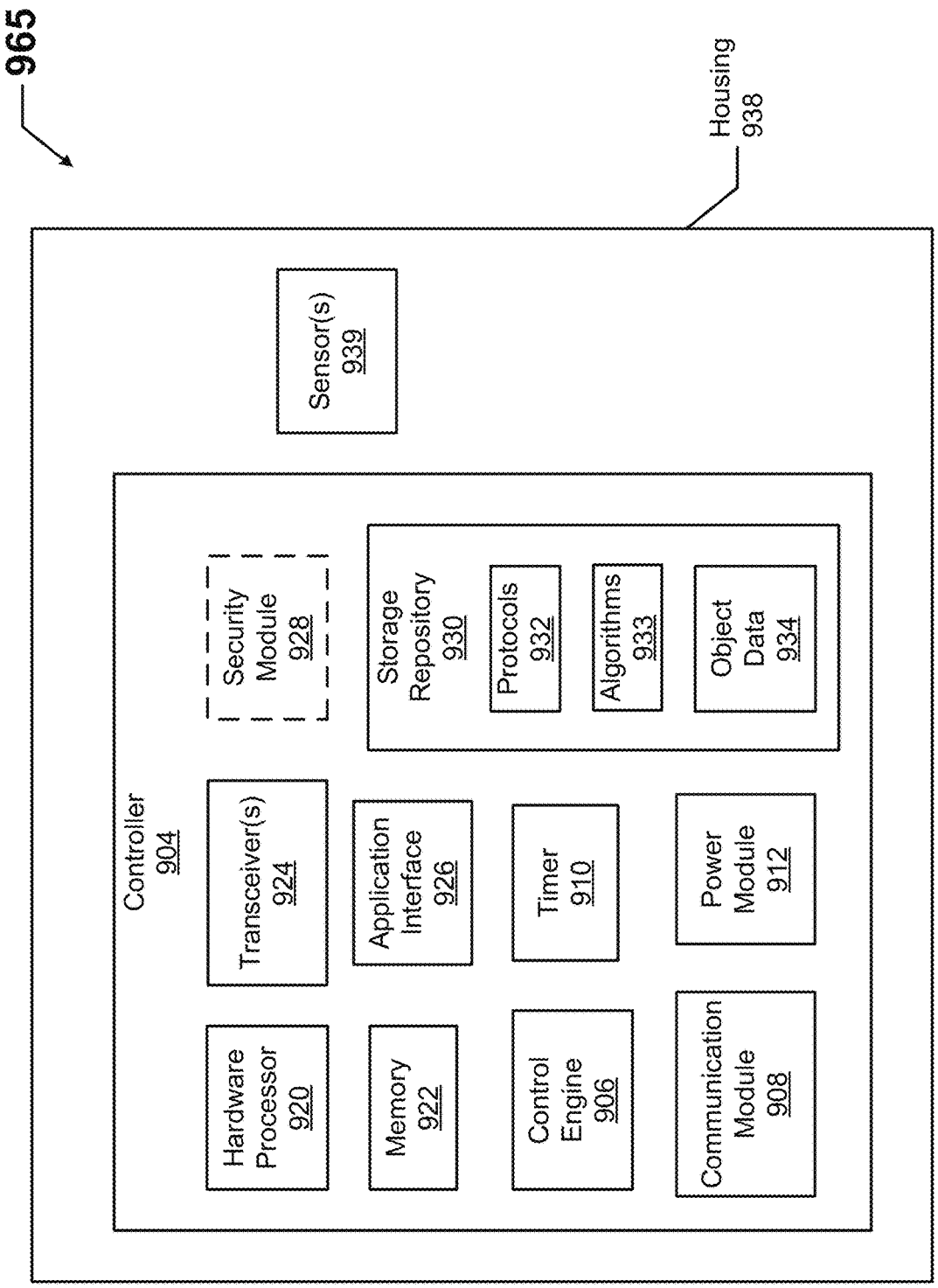
FIG. 9 shows a diagram of an integrated sensor module in accordance with certain example embodiments.

FIG. 9 shows a diagram of an integrated sensor module 965 in accordance with certain example embodiments. Referring to FIGS. 1 through 9, the integrated sensor module 965 of FIG. 9 can include one or more of a number of components. Such components, can include, but are not limited to, a controller 904 (which can include, for example, a control engine 906, a communication module 908, a timer 910, a power module 912, a storage repository 930, a hardware processor 920, a memory 922, one or more transceivers 924, an application interface 926, and, optionally, a security module 928) and one or more sensors 939. The components shown in FIG. 9 are not exhaustive, and in some embodiments, one or more of the components shown in FIG. 9 may not be included in an example integrated sensor device 965. Any component of the example integrated sensor device 965 can be discrete, combined with one or more other components of the integrated sensor device 965, and/or shared with the controller 104 of the electrical device 102-1 associated with the integrated sensor device 965.

The controller 904, the control engine 906, the communication module 908, the timer 910, the power module 912, the storage repository 930 (which can include protocols 931, algorithms 932, and object data 934), the hardware processor 920, the memory 922, the one or more transceivers 924, the application interface 926, and the security module 928 can be substantially the same as the corresponding components of the controller 104 discussed above with respect to FIG. 1. In the case of the power module 912 of the integrated sensor device 965, the power module 912 can be substantially the same as, at least in part, the power module 112 and/or the power supply 140 of the electrical device 102-1. Each of the one or more sensors 939 of the integrated sensor device 965 are the components that actually measure one or more parameters. An example of a sensor 939 is a PIR sensor. Each component of the integrated sensor device 965 can be disposed within, on, or external from a housing 938 of the integrated sensor device 965.

Figure 10:
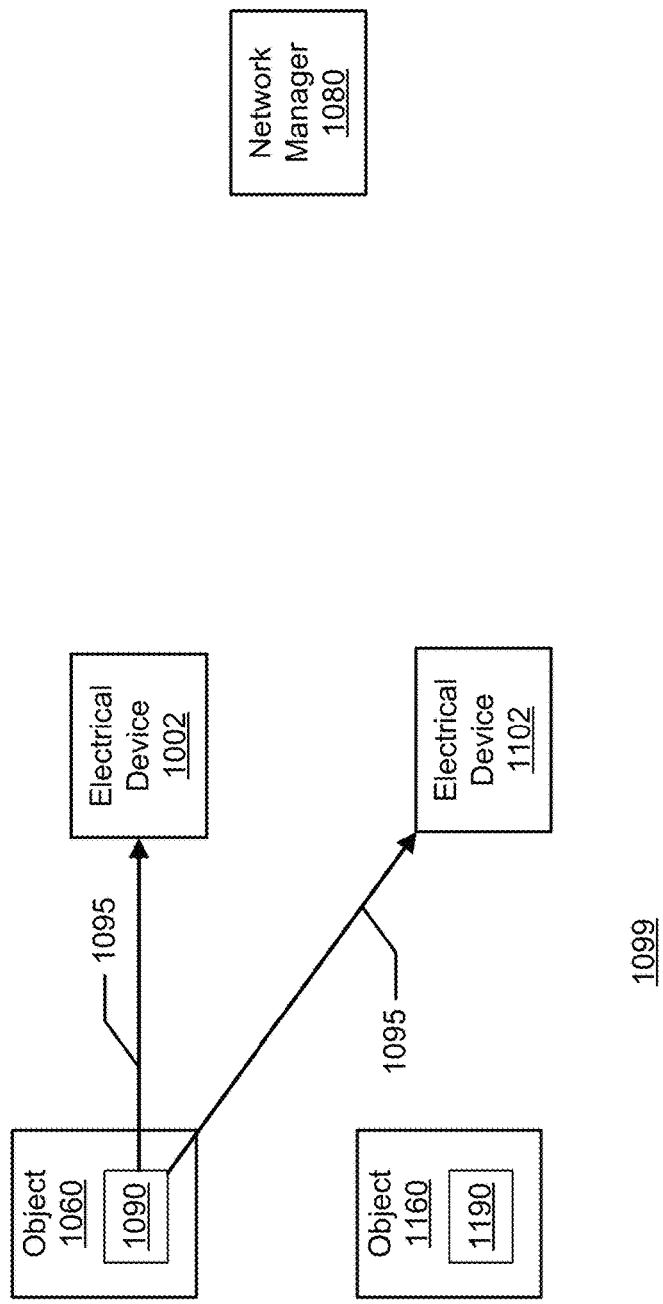
FIGS. 10-15 show an example in accordance with certain example embodiments.
Figure 11:
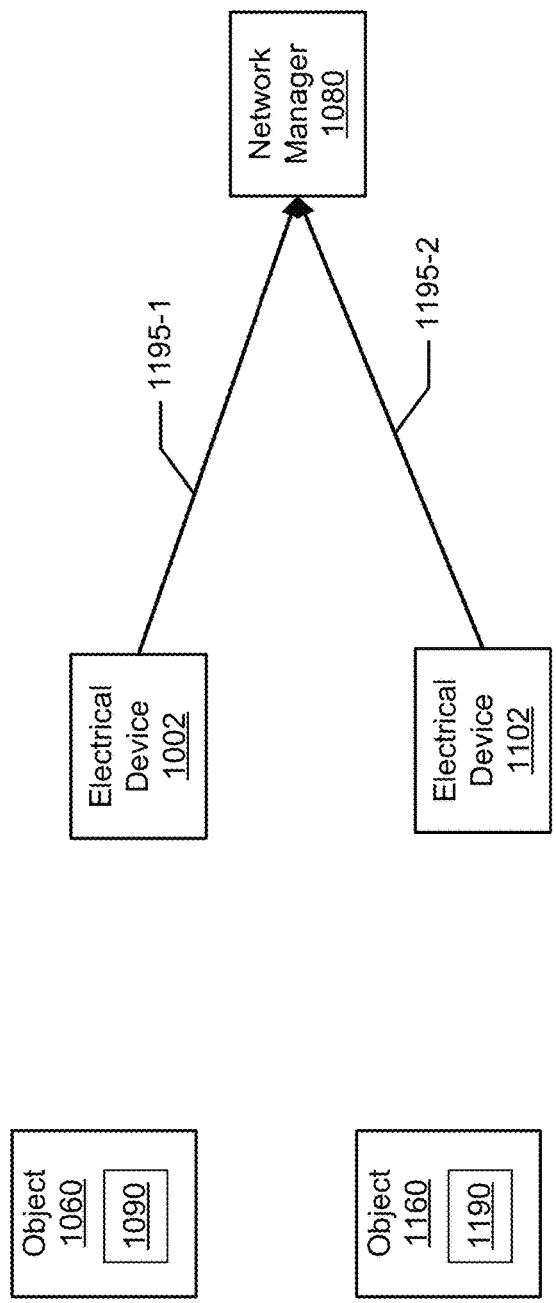
Figure 12:
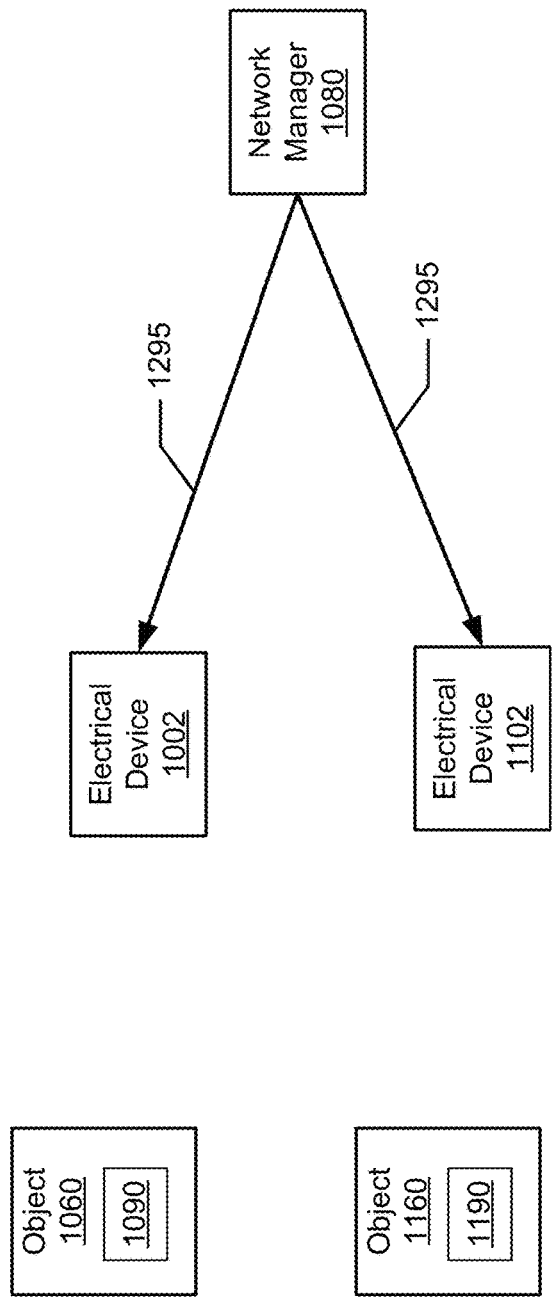
Figure 13:
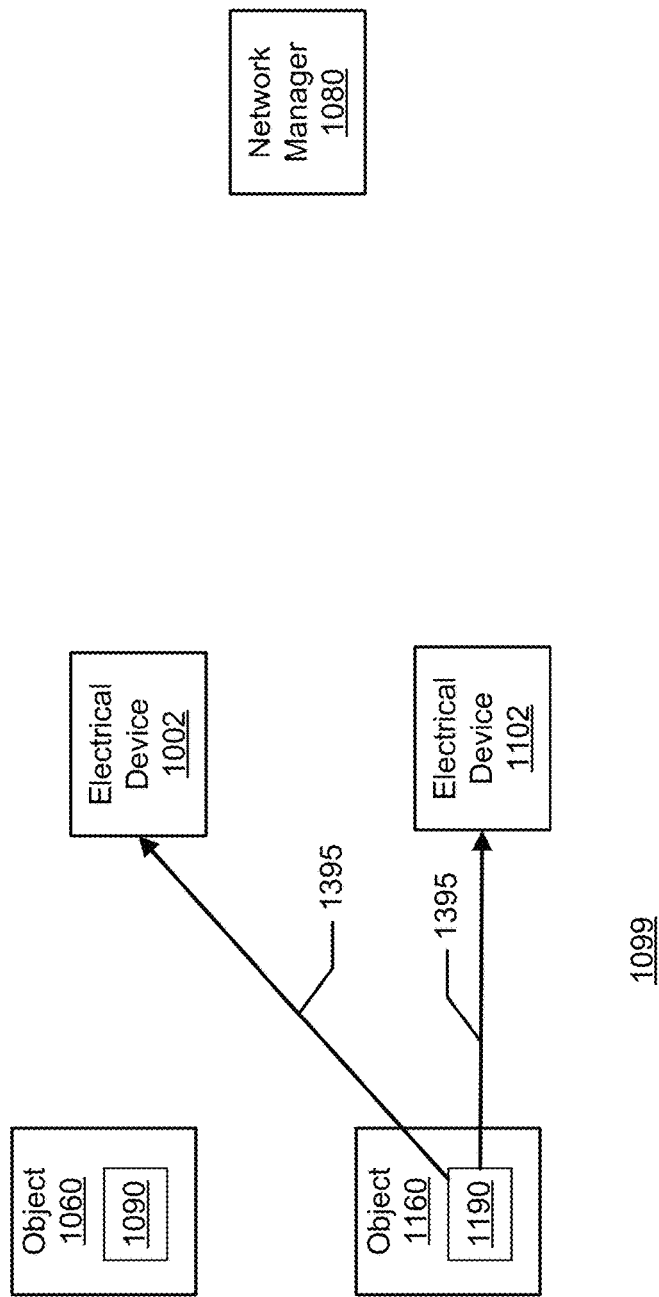
Figure 14:
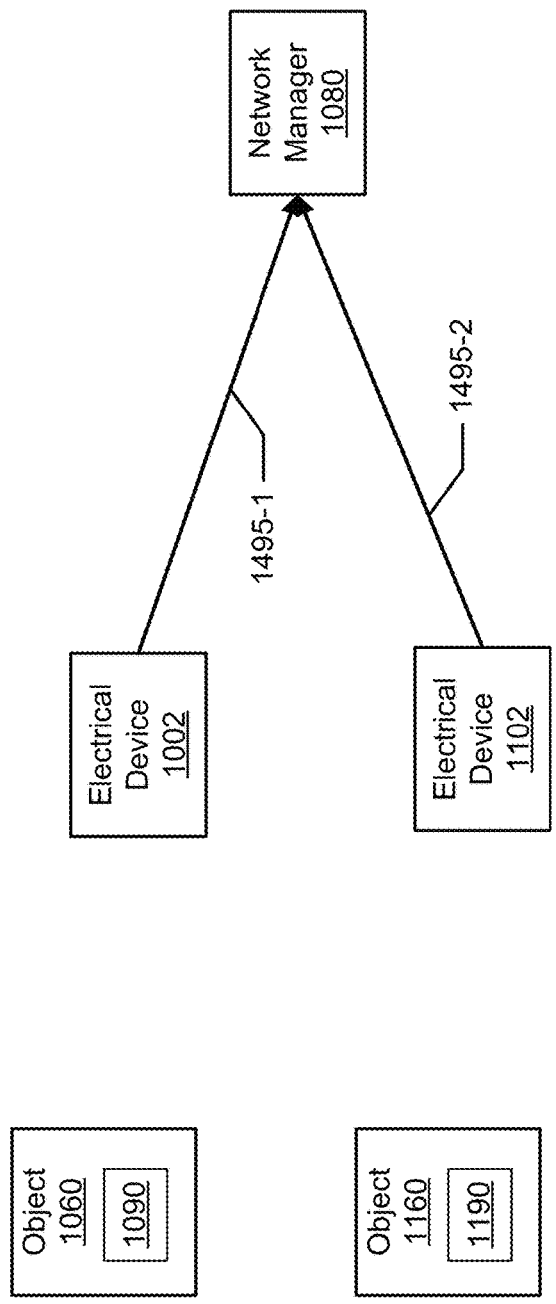
Figure 15:
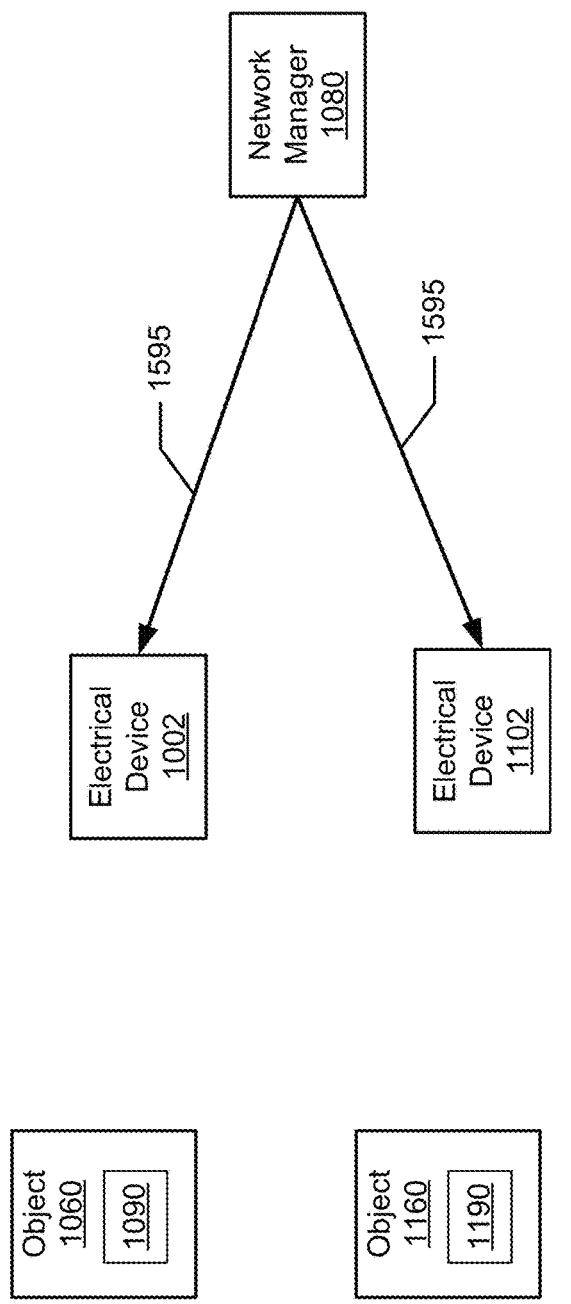

FIGS. 10-15 show an example in accordance with certain example embodiments. Specifically, FIG. 10 shows a system 1098 in accordance with certain example embodiments at a first point in time. FIG. 11 shows a system 1198 that includes the same components as the system 1098 of FIG. 10 at a second point in time. FIG. 12 shows a system 1298 that includes the same components as the system 1098 of FIG. 10 at a third point in time. FIG. 13 shows a system 1398 that includes the same components as the system 1098 of FIG. 10 at a fourth point in time. FIG. 14 shows a system 1498 that includes the same components as the system 1098 of FIG. 10 at a fifth point in time. FIG. 15 shows a system 1598 that includes the same components as the system 1098 of FIG. 10 at a sixth point in time.

Referring to FIGS. 1-15, the system 1098 of FIG. 10 includes an object 1060 with a communication device 1090, an object 1160 with a communication device 1190, an electrical device 1002, an electrical device 1102, and a network manager 1080. Object 1060, object 1160, electrical device 1002, and electrical device 1102 are located in a volume of space 1099. The network manager 1080 may or may not be located in the volume of space 1099. The network manager 1080, electrical device 1002, electrical device 1102, object 1060, communication device 1090, and communication signals of FIGS. 10-15 can be substantially the same as the network manager, electrical devices, objects, and communication devices discussed above with respect to FIGS. 1 through 9.

The example captured in FIGS. 10-15 does not include a WAC (e.g., WAC 185). In one or more alternative embodiments, a WAC can replace the network manager 1080. In yet one or more alternative embodiments, a WAC can be disposed between and communicably coupled to the network manager 1080 one one side and electrical device 1002 and electrical device 1102 on another side. In such a case, the WAC can generate and maintain the table discussed below. As a result, communications between the WAC and the network manager 1080 that involve object 1060 (or the associated communication device 1090) and/or object 1160 (or the associated communication device 1190) can use the original ID or the alternative ID, depending in part on whether the portion of the communication network between the WAC and the network manager 1080 is constrained and whether the network manager 1080 stores a copy of the table with such identification information. Alternatively, the WAC can be a go-between or pass-through for the network manager 1080 one one side and electrical device 1002 and electrical device 1102 on the other side.

In the system 1098 of FIG. 10, the communication device 1090 of object 1060 broadcasts a communication signal 1095 into the volume of space 1099. The broadcast ranges of electrical device 1002 and electrical device 1102 are within (overlap with) the broadcast range of the communication device 1090 of the object 1060, and so the communication signal 1095 is received by both electrical device 1002 and electrical device 1102. The communication signal 1095 in this case includes the 48-bit identification of the object 1060 or the communication device 1090.

In the system 1198 of FIG. 11, which occurs an amount of time (e.g., 1 second, 1 minute, 0.1 seconds) after what is shown in FIG. 10, electrical device 1002 sends a communication signal 1195-1 to the network manager 1080, and electrical device 1102 sends a communication signal 1195-2 to the network manager 1080. If electrical device 1002 does not already have a table with the alternative ID (e.g., SMAC address) for the object 1060 (or the associated communication device 1090), then the communication signal 1195-1 includes the original 48-bit identification of the object 1060 (or associated communication device 1090) and the identification of electrical device 1002. Otherwise, if the electrical device 1002 does already have a table with the alternative ID (e.g., SMAC address) for the object 1060 (or the associated communication device 1090), then the communication signal 1195-1 includes the alternative ID (as opposed to the original 48-bit identification) for the object 1060 (or associated communication device 1090).

Similarly, electrical device 1102 does not already have a table with the alternative ID (e.g., SMAC address) for the object 1060 (or the associated communication device 1090), then the communication signal 1195-2 includes the original 48-bit identification of the object 1060 (or associated communication device 1090) and the identification of electrical device 1102. Otherwise, if the electrical device 1102 does already have a table with the alternative ID (e.g., SMAC address) for the object 1060 (or the associated communication device 1090), then the communication signal 1195-2 includes the alternative ID (as opposed to the original 48-bit identification) for the object 1060 (or associated communication device 1090).

These two communication signals 1195 can be sent at the same time or within some range of time (e.g., 1 second, 1 minute, 0.1 seconds) with respect to each other. In some cases, if the alternative ID for the object 1060 (or associated communication device 1090) is not already stored with electrical device 1002 or electrical device 1102, then rather than sending the full 6-byte identification, the electrical device 1002 and/or electrical device 1102 can send a shorter (e.g., 3-byte) identification as part of the communication signal 1195. In such a case, for example if a 3-byte identification is sent as part of a communication signal 1195, then it can be assumed by the network manager 1080 that the first (top) 3 bytes (or remainder of the normal 6-byte capacity that was not part of the shorter identification) of the identification of the object 1060 or associated communication device 1090 are a fixed origination unique identifier (OUI). This shorter identification would not be as short as the alternative identification generated and maintained by the network manager 1080.

When the network manager 1080 receives communication signal 1195-1 and communication signal 1195-2, the network manager 1080 determines the content of those communication signals 1195. For example, the network manager 1080 can determine the 48-bit identification (e.g., the MAC address) of the object 1060 (or the associated communication device 1090), a time associated with a communication involving the object 1060 or the associated communication device 1090 (e.g., the time at which the communication signal 1095 was sent, the time at which the communication signal 1095 was received, the time at which the communication signal 1195 was sent, the time at which the communication signal 1195 was received), and the identification of the electrical device (electrical device 1002 or electrical device 1102) sending the communication signal 1195.

In certain example embodiments, the controller (e.g., controller 104) of the network manager 1080 can generate/update one or more tables that include the original identification information associated with the object 1060 (or the associated communication device 1090). As part of generating and maintaining such a table, the controller of the network manager 1080 can generate an alternative (shorter) identification of the object 1060 (or the associated communication device 1090). The following portion of such a table is an example of what the controller of the network manager 1080 can generate based on the information included in the communication signals 1195 received from electrical device 1002 and/or electrical device 1102.

| Original ID | Alternative ID | Time Stamp of Most Recent Activity | Priority |
|---|---|---|---|
| 100110001101010111000011000110100111100101101010 | 10011101 | 13:54:22 on May 30, 2019 | 1 |

In this case, the alternative identification (e.g., the SMAC address) of the object 1060 (or associated communication device 1090) is 8 bits instead of the 48 bits of the original identification (e.g., the MAC address). The 8-bit alternative identification can be used, for example, when there are less than 256 objects/communication devices in the system. If there are more than 256 objects/communication devices in the system but less than 512 objects/communication devices in the system, then the alternative identification (e.g., SMAC address) can be 9 bits. If there are more than 512 objects/communication devices in the system but less than 1024 objects/communication devices in the system, then the alternative identification (e.g., SMAC address) can be 10 bits. If there are more than 1024 objects/communication devices in the system but less than 2048 objects/communication devices in the system, then the alternative identification (e.g., SMAC address) can be 11 bits.

The decision as to the size of the alternative identification, or even whether to create an alternative identification, can be made by the controller (e.g., controller) of the network manager 1080. For example, if the network manager 1080 determines that the portion of the communication network between the network manager 1080 on one side and electrical device 1002 and/or electrical device 1102 is not constrained, then the network manager can opt not to generate an alternative identification for the object 1060 or associated communication device 1090. As another example, if the network manager 1080 determines that a greater number of objects (e.g., object 1060) or associated communication devices (e.g., communication device 1090) is in the system 1198 compared to what previously existed, then the network manager can convert existing alternative identifications from a 7-bit size to an 8-bit size, and the network manager can also generate 8-bit alternative identifications for new objects or associated communication devices.

If there is further communication (e.g., with a WAC 185, with a network manager 180 of another system 100) that the network manager 1080 has involving the identification of the object 1060 (or associated communication device 1090), then the network manager 1080 can generate and transmit communication signals (e.g., communication signals 195) that use the original ID of the object 1060 (or associated communication device 1090) when the recipient does not have a copy of the table that includes the alternative ID of the object 1060 (or associated communication device 1090). If the recipient does have a copy of the table that includes the alternative ID of the object 1060 (or associated communication device 1090), then a communication signal generated and transmitted by the network manager 1080 to the recipient can include the alternative ID of the object 1060 (or associated communication device 1090).

In the system 1298 of FIG. 12, which occurs an amount of time after what is shown in FIG. 11, the network manager 1080 broadcasts a communication signal 1295 (or series of communication signals 1295) that is received by electrical device 1002 and electrical device 1102. The communication signal 1295 can include at least the part of the table shown above with respect to the original identification of the object 1060 (or associated communication device 1090), the alternative identification of the object 1060 (or associated communication device 1090), the last recorded communication from the object 1060 (or associated communication device 1090), and the priority of the object 1060 (or associated communication device 1090) relative to other objects (or communication devices) in an overall system.

As an alternative, rather than broadcasting the communication signal 1295, the network manager 1080 can send separate communication signals 1295 that are individually addressed to electrical device 1002 and to electrical device 1102. The communication signals 1295 can include the entire table maintained by the network manager 1080. Alternatively, the communication signals 1295 can only contain the portions of the table that have been revised, deleted, or added since the previous such communication signal sent by the network manager 1080 to electrical device 1002 and electrical device 1102.

In the system 1398 of FIG. 13, the communication device 1190 of object 1160 broadcasts a communication signal 1395 into the volume of space 1099. The broadcast ranges of electrical device 1002 and electrical device 1102 are within (overlap with) the broadcast range of the communication device 1190 of the object 1160, and so the communication signal 1395 is received by both electrical device 1002 and electrical device 1102. The communication signal 1395 in this case includes the 48-bit identification of the object 1160 or the communication device 1190.

In the system 1498 of FIG. 14, which occurs an amount of time (e.g., 1 second, 1 minute, 0.1 seconds) after what is shown in FIG. 13, electrical device 1002 sends a communication signal 1495-1 to the network manager 1080, and electrical device 1102 sends a communication signal 1495-2 to the network manager 1080. If electrical device 1002 does not already have a table with the alternative ID (e.g., SMAC address) for the object 1160 (or the associated communication device 1190), then the communication signal 1495-1 includes the original 48-bit identification of the object 1160 (or associated communication device 1190) and the identification of electrical device 1002. Otherwise, if the electrical device 1002 does already have a table with the alternative ID (e.g., SMAC address) for the object 1160 (or the associated communication device 1190), then the communication signal 1495-1 includes the alternative ID (as opposed to the original 48-bit identification) for the object 1160 (or associated communication device 1190).

Similarly, electrical device 1102 does not already have a table with the alternative ID (e.g., SMAC address) for the object 1160 (or the associated communication device 1190), then the communication signal 1495-2 includes the original 48-bit identification of the object 1160 (or associated communication device 1190) and the identification of electrical device 1102. Otherwise, if the electrical device 1102 does already have a table with the alternative ID (e.g., SMAC address) for the object 1160 (or the associated communication device 1190), then the communication signal 1495-2 includes the alternative ID (as opposed to the original 48-bit identification) for the object 1160 (or associated communication device 1190).

These two communication signals 1495 can be sent at the same time or within some range of time (e.g., 1 second, 1 minute, 0.1 seconds) with respect to each other. In some cases, if the alternative ID for the object 1060 (or associated communication device 1090) is not already stored with electrical device 1002 or electrical device 1102, then rather than sending the full 6-byte identification, the electrical device 1002 and/or electrical device 1102 can send a shorter (e.g., 3-byte) identification as part of the communication signal 1495. In such a case, for example if a 3-byte identification is sent as part of a communication signal 1195, then it can be assumed by the network manager 1080 that the first (top) 3 bytes (or remainder of the normal 6-byte capacity that was not part of the shorter identification) of the identification of the object 1060 or associated communication device 1090 are a fixed OUI. This shorter identification would not be as short as the alternative identification generated and maintained by the network manager 1080.

When the network manager 1080 receives communication signal 1495-1 and communication signal 1495-2, the network manager 1080 determines the content of those communication signals 1495. For example, the network manager 1080 can determine the 48-bit identification (e.g., the MAC address) of the object 1160 (or the associated communication device 1190), a time associated with a communication involving the object 1160 or the associated communication device 1190 (e.g., the time at which the communication signal 1395 was sent, the time at which the communication signal 1395 was received, the time at which the communication signal 1495 was sent, the time at which the communication signal 1495 was received), and the identification of the electrical device (electrical device 1002 or electrical device 1102) sending the communication signal 1495.

In certain example embodiments, the controller (e.g., controller 104) of the network manager 1080 can update one or more tables (e.g., the table shown above) that include the original identification information associated with the object 1160 (or the associated communication device 1190). As part of maintaining such a table, the controller of the network manager 1080 can generate an alternative (shorter) identification of the object 1160 (or the associated communication device 1190). The following portion of such a table, which is an update of the portion of the table shown above, is an example of what the controller of the network manager 1080 can generate based on the information included in the communication signals 1495 received from electrical device 1002 and/or electrical device 1102.

have a copy of the table that includes the alternative ID of the object 1160 (or associated communication device 1190). If the recipient does have a copy of the table that includes the alternative ID of the object 1160 (or associated communication device 1190), then a communication signal generated and transmitted by the network manager 1080 to the recipient can include the alternative ID of the object 1160 (or associated communication device 1190).

In the system 1598 of FIG. 15, which occurs an amount of time after what is shown in FIG. 14, the network manager 1080 broadcasts a communication signal 1595 (or series of communication signals 1595) that is received by electrical device 1002 and electrical device 1102. The communication signal 1595 can include at least the part of the table shown above with respect to the original identification of the object 1160 (or associated communication device 1190), the alternative identification of the object 1160 (or associated communication device 1190), the last recorded communication from the object 1160 (or associated communication device 1190), and the priority of the object 1160 (or associated communication device 1190) relative to other objects (or communication devices) in an overall system.

As an alternative, rather than broadcasting the communication signal 1595, the network manager 1080 can send separate communication signals 1595 that are individually addressed to electrical device 1002 and to electrical device 1102. The communication signals 1595 can include the entire table maintained by the network manager 1080. Alternatively, the communication signals 1595 can only contain the portions of the table that have been revised, deleted, or added since the previous such communication signal sent by the network manager 1080 to electrical device 1002 and electrical device 1102.

| Original ID | Alternative ID | Time Stamp of Most Recent Activity | Priority |
|---|---|---|---|
| 100110001101010111000011000110100111100101101010 | 10011101 | 13:54:22 on May 30, 2019 | 1 |
| 111010000101100100011011101100010100011001100011 | 11010010 | 09:24:49 on Jun. 26, 2019 | 4 |

In this case, as with what is described above with respect to FIG. 11, the alternative identification (e.g., the SMAC address) of the object 1160 (or associated communication device 1190) is 8 bits instead of the 48 bits of the original identification (e.g., the MAC address). The updated table shows that the object 1160 (or associated communication device 1190) has a lower priority relative to the object 1060 (or associated communication device 1090). The updated table also shows that almost a month has passed since the last communication signal (e.g., communication signal 1095) sent by the communication device 1090 of object 1060.

If there is further communication (e.g., with a WAC 185, with a network manager 180 of another system 100) that the network manager 1080 has involving the identification of the object 1160 (or associated communication device 1190), then the network manager 1080 can generate and transmit communication signals (e.g., communication signals 195) that use the original ID of the object 1160 (or associated communication device 1190) when the recipient does not In some cases, rather than the portion of the previous table shown above, if a threshold value of time (e.g., 20 days) has passed since the last communication signal received from the communication device 1090 of the object 1060, then the network manager 1080 can purge the entry for the object 1060 (or associated communication device 1090) from the table. Alternatively, the network manager 1080 can keep the record about object 1060 in the table, but then send a version of the table that removes the entry for the object 1060.

In one or more example embodiments, alternative identifications are provided to low end devices in a large interconnected network. The alternative identifications can be assigned toward the low end of the hierarchy of the interconnected network or toward the upper end of the hierarchy of the interconnected network. The alternative identifications assigned in example embodiments can be put into tables that are used for all or a subset of a network. In other words, multiple tables can exist, where each table captures the alternative identification of a subset (e.g., a certain volume of space, certain tags) of devices in a network. In certain example embodiments, a table containing alternative identifications are updated on a regular basis, including purging inactive tags.

Example embodiments can be used with systems used for real-time location (RTLS) of objects. In such a case, example embodiments can be used to more efficiently locate an object in a volume of space relative to current systems and methods by reducing the size of communication signals transmitted. Example embodiments can be used with multiple communication protocols and/or methods. Example embodiments can be used in new systems or retrofit into existing systems. Example embodiments include new or updated software so that a network can work more efficiently. Using example embodiments described herein can improve communication, safety, maintenance, costs, and operating efficiency.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for assigning alternative identification to objects in a volume of space, comprising:
   a first communication device of a first object disposed in the volume of space, wherein the first communication device broadcasts a first communication signal into the volume of space, wherein the first communication signal comprises a first identification of the first object;
   a first electrical device disposed in the volume of space, wherein the first electrical device comprises a first receiver and a first transmitter, wherein the first receiver receives the first communication signal broadcast by the first communication device of the first object; and
   a controller communicably coupled to the first electrical device, wherein the controller:
      retrieves the first identification of the first communication device from the first communication signal, wherein the first identification has a first length;
      assigns a first alternative identification to the first communication device based on the first identification, wherein the first alternative identification has a second length that is shorter than the first length;
      saves an association between the first identification and the first alternative identification of the first object in a first table; and
      sends a second communication signal comprising the first table, wherein the first table includes the association between the first alternative identification and the first identification of the first object.

2. The system of claim 1, wherein the controller is part of the first electrical device.

3. The system of claim 1, wherein the controller is part of a wireless access controller.

4. The system of claim 1, wherein the controller is part of a network manager.

5. The system of claim 1, wherein the first identification is 48 bits, and wherein the first alternative identification is between 8 bits and 11 bits.

6. The system of claim 1, wherein the electrical device comprises a light fixture.

7. The system of claim 1, wherein the electrical device comprises an integrated sensor device.

8. The system of claim 1, wherein the first communication signal is a radio frequency signal.

9. The system of claim 1, wherein the first table also includes a first at which the first communication signal is received.

10. The system of claim 9, wherein the controller further removes the first identification and the first alternative identification of the first object from the first table at a second time when a difference between the second time and the first time exceeds a threshold value of time and when no subsequent communication signal is received from the first communication device since the first time.

11. The system of claim 1, wherein the first table also includes a priority indicator for the first object relative to other objects in the volume of space.

12. The system of claim 1, further comprising:
   a second communication device of a second object disposed in the volume of space, wherein the second communication device broadcasts a third communication signal into the volume of space, wherein the third communication signal comprises a second identification of the second object; and
   a second electrical device disposed in the volume of space, wherein the second electrical device comprises a second receiver and a second transmitter, wherein the second receiver receives the third communication signal broadcast by the second communication device of the second object,
   wherein the controller is further communicably coupled to the second electrical device, wherein the controller further:
      retrieves the second identification of the second communication device from the third communication signal;
      assigns a second alternative identification to the second communication device based on the second identification;
      saves the second identification and the second alternative identification of the second object in the first table; and
      sends a fourth communication signal comprising the second alternative identification and the second identification of the second object.

13. The system of claim 12, wherein the controller further sends the first alternative identification and the first identification of the first object in the fourth communication signal.

14. The system of claim 1, further comprising:
   a second communication device of a second object disposed in the volume of space, wherein the second communication device broadcasts a third communication signal into the volume of space, wherein the third communication signal comprises a second identification of the second object,
   wherein the first receiver of the first electrical device receives the third communication signal broadcast by the second communication device of the second object,
   wherein the controller is further communicably coupled to the second electrical device, wherein the controller further:
      retrieves the second identification of the second communication device from the third communication signal;

assigns a second alternative identification to the second communication device based on the second identification;

saves the second identification and the second alternative identification of the second object in the first table; and sends a fourth communication signal comprising the second alternative identification and the second identification of the second object.

15. The system of claim 1, further comprising:

a second communication device of a second object disposed in the volume of space, wherein the second communication device broadcasts a third communication signal into the volume of space, wherein the third communication signal comprises a second identification of the second object; and a second electrical device disposed in the volume of space, wherein the second electrical device comprises a second receiver and a second transmitter, wherein the second receiver receives the third communication signal broadcast by the second communication device of the second object, wherein the controller is further communicably coupled to the second electrical device, wherein the controller further:

retrieves the second identification of the second communication device from the third communication signal;

assigns a second alternative identification to the second communication device based on the second identification;

saves the second identification and the second alternative identification of the second object in a second table; and sends a fourth communication signal comprising the second alternative identification and the second identification of the second object.

16. The system of claim 1, wherein the controller further locates the first object within the volume of space in real time.

17. A controller for assigning alternative identification to objects in a volume of space, wherein the controller is configured to:

receive a first identification of a first communication device associated with a first object in a first communication signal, wherein the first identification has a first length;

assign a first alternative identification to the first communication device based on the first identification, wherein the first alternative identification has a second length that is shorter than the first length;

save an association between the first identification and the first alternative identification of the first object in a table; and send a second communication signal comprising at least a portion of the table containing the association between the first alternative identification and the first identification of the first object.

18. The controller of claim 17, wherein the controller is configured to:

receive a second identification of a second communication device associated with a second object in a third communication signal;

assign a second alternative identification to the second communication device based on the second identification;

save the second identification and the second alternative identification of the second object in the table; and send a fourth communication signal comprising the second alternative identification and the second identification of the second object.

19. The controller of claim 17, wherein the controller is configured to:

receive a second identification of a second communication device associated with a second object in a third communication signal;

assign a second alternative identification to the second communication device based on the second identification;

save the second identification and the second alternative identification of the second object in an additional table; and send a fourth communication signal comprising the second alternative identification and the second identification of the second object.

20. The controller of claim 17, wherein the controller is further configured to:

remove the first identification and the first alternative identification of the first object from the table when an amount of time since the first communication signal has been received with no subsequent communication signal associated with the first object exceeds a threshold value of time.

* * * * *